United States Patent
Lee et al.

(10) Patent No.: US 12,273,270 B2
(45) Date of Patent: Apr. 8, 2025

(54) CONGESTION MANAGEMENT TECHNIQUES

(71) Applicant: Intel Corporation, Santa Clara, CA (US)

(72) Inventors: Jeongkeun Lee, Mountain View, CA (US); Rong Pan, Saratoga, CA (US); Changhoon Kim, Palo Alto, CA (US); Jeremias Blendin, Santa Clara, CA (US); Georgios Nikolaidis, Mountain View, CA (US); Ashutosh Agrawal, Fremont, CA (US); Ethan M. Spiegel, Mountain View, CA (US); Anurag Agrawal, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 457 days.

(21) Appl. No.: 16/878,466

(22) Filed: May 19, 2020

(65) Prior Publication Data
US 2020/0280518 A1    Sep. 3, 2020

Related U.S. Application Data

(60) Provisional application No. 62/967,003, filed on Jan. 28, 2020.

(51) Int. Cl.
*H04L 47/11* (2022.01)
*H04L 47/12* (2022.01)
(Continued)

(52) U.S. Cl.
CPC .......... *H04L 47/115* (2013.01); *H04L 47/12* (2013.01); *H04L 47/263* (2013.01); *H04L 47/30* (2013.01)

(58) Field of Classification Search
None
See application file for complete search history.

(56) References Cited

U.S. PATENT DOCUMENTS 6,175,554 B1    1/2001    Jang et al.
7,369,498 B1    5/2008    Ma et al.
(Continued)

FOREIGN PATENT DOCUMENTS

CN    101005460 A  *  7/2007
CN    101414957 A     12/2010
(Continued)

OTHER PUBLICATIONS

"Media Access Control (MAC) Bridges and Virtual Bridged Local Area Networks—Amendment 17: Priority-based Flow Control", IEEE Standard for Local and metropolitan area networks—IEEE Computer Society, Sep. 30, 2011, 40 pages.
(Continued)

*Primary Examiner* — Jay L Vogel
(74) *Attorney, Agent, or Firm* — Compass IP Law PC

(57) ABSTRACT

Examples described herein relate to a network element comprising an ingress pipeline and at least one queue from which to egress packets. The network element can receive a packet and generate a congestion notification packet at the ingress pipeline to a sender of the packet based on detection of congestion in a target queue that is to store the packet and before the packet is stored in a congested target queue. The network element can generate a congestion notification packet based on a queue depth of the target queue and likelihood the target queue is congested. The likelihood the queue is congested can be based on a probabilistic function including one or more of Proportional-Integral (PI) or Random Early Detection (RED). The network element can determine a pause time for the sender to pause sending
(Continued)

particular packets based at least on a time for the target queue to drain to a target level.

24 Claims, 12 Drawing Sheets

(51) Int. Cl.
  *H04L 47/263* (2022.01)
  *H04L 47/30* (2022.01)

(56) References Cited

U.S. PATENT DOCUMENTS

| | | | |
|---|---|---|---|
| 7,386,721 | B1 | 6/2008 | Vilhuber et al. |
| 7,738,376 | B2 | 6/2010 | Balakrishnan et al. |
| 8,077,606 | B1* | 12/2011 | Litwack .............. H04L 47/2483 |
| | | | 370/229 |
| 9,270,598 | B1 | 2/2016 | Oran et al. |
| 9,444,741 | B2 | 9/2016 | Agarwal et al. |
| 10,148,746 | B2 | 12/2018 | Itkin et al. |
| 10,606,604 | B2 | 3/2020 | Sharma et al. |
| 10,673,816 | B1 | 6/2020 | Robertson et al. |
| 11,057,294 | B2 | 7/2021 | Inoue et al. |
| 11,088,966 | B2 | 8/2021 | Menachem et al. |
| 2002/0041328 | A1 | 4/2002 | LeCompte et al. |
| 2002/0099854 | A1 | 7/2002 | Jorgensen |
| 2002/0176361 | A1 | 11/2002 | Wu et al. |
| 2003/0035373 | A1 | 2/2003 | Bass et al. |
| 2003/0076781 | A1 | 4/2003 | Enomoto et al. |
| 2003/0210651 | A1* | 11/2003 | Tzeng ..................... H04L 47/24 |
| | | | 370/231 |
| 2005/0157750 | A1 | 7/2005 | Rabie et al. |
| 2006/0015639 | A1 | 1/2006 | Taylor |
| 2006/0018329 | A1 | 1/2006 | Nielsen et al. |
| 2006/0026279 | A1 | 2/2006 | Zigmond et al. |
| 2006/0056308 | A1 | 3/2006 | Gusat et al. |
| 2006/0092836 | A1* | 5/2006 | Kwan ..................... H04L 47/12 |
| | | | 370/389 |
| 2006/0159016 | A1 | 7/2006 | Sagfors et al. |
| 2006/0203730 | A1 | 9/2006 | Zur |
| 2006/0215550 | A1 | 9/2006 | Malhotra |
| 2007/0058532 | A1 | 3/2007 | Wadekar et al. |
| 2007/0076604 | A1 | 4/2007 | Litwack |
| 2007/0127381 | A1 | 6/2007 | Oh et al. |
| 2008/0186989 | A1 | 8/2008 | Kim |
| 2008/0259798 | A1 | 10/2008 | Loh et al. |
| 2009/0238068 | A1 | 9/2009 | DeCusatis et al. |
| 2010/0039937 | A1 | 2/2010 | Ramanujan et al. |
| 2010/0100822 | A1 | 4/2010 | Aaron et al. |
| 2010/0214943 | A1 | 8/2010 | Immendorf et al. |
| 2010/0246583 | A1 | 9/2010 | Morinaga et al. |
| 2010/0254262 | A1 | 10/2010 | Kantawala et al. |
| 2011/0016209 | A1 | 1/2011 | Moncaster et al. |
| 2011/0019549 | A1 | 1/2011 | Strulo et al. |
| 2011/0044169 | A1 | 2/2011 | Liu |
| 2011/0069616 | A1 | 3/2011 | Revels |
| 2011/0170410 | A1 | 7/2011 | Zhao et al. |
| 2011/0202926 | A1 | 8/2011 | Chambliss |
| 2011/0205895 | A1 | 8/2011 | Chen et al. |
| 2011/0255410 | A1 | 10/2011 | Yamen et al. |
| 2012/0008502 | A1 | 1/2012 | Kadambi et al. |
| 2012/0155262 | A1 | 6/2012 | Li et al. |
| 2012/0320779 | A1 | 12/2012 | Smith et al. |
| 2013/0182568 | A1 | 7/2013 | Lee et al. |
| 2013/0185454 | A1* | 7/2013 | Guillemin ............. H04L 47/122 |
| | | | 709/235 |
| 2013/0246650 | A1 | 9/2013 | Tsuboki et al. |
| 2014/0071831 | A1 | 3/2014 | Sinha et al. |
| 2014/0192646 | A1* | 7/2014 | Mir ..................... H04L 47/2441 |
| | | | 370/235 |
| 2014/0233382 | A1 | 8/2014 | Matthews et al. |
| 2014/0233390 | A1 | 8/2014 | Schmid et al. |
| 2014/0254357 | A1 | 9/2014 | Agarwal et al. |
| 2014/0269271 | A1* | 9/2014 | Gafni ..................... H04L 47/32 |
| | | | 370/236 |
| 2015/0071072 | A1 | 3/2015 | Ratzin et al. |
| 2015/0156082 | A1 | 6/2015 | Kakadia et al. |
| 2015/0163117 | A1 | 6/2015 | Lambeth et al. |
| 2015/0180924 | A1* | 6/2015 | O'Callaghan .......... H04L 65/80 |
| | | | 709/219 |
| 2015/0195150 | A1 | 7/2015 | Ritter et al. |
| 2015/0195209 | A1 | 7/2015 | Bottorff et al. |
| 2015/0222550 | A1 | 8/2015 | Anand |
| 2015/0236957 | A1 | 8/2015 | Albanese et al. |
| 2015/0271081 | A1 | 9/2015 | Arumilli et al. |
| 2015/0295856 | A1 | 10/2015 | Karthikeyan et al. |
| 2015/0350097 | A1 | 12/2015 | Osuga |
| 2016/0014029 | A1 | 1/2016 | Yuan et al. |
| 2016/0050653 | A1 | 2/2016 | Rastogi |
| 2016/0057040 | A1 | 2/2016 | Bergeron |
| 2016/0113025 | A1 | 4/2016 | Shaw et al. |
| 2016/0183374 | A1 | 6/2016 | Prakash et al. |
| 2016/0308769 | A1 | 10/2016 | Versteeg et al. |
| 2017/0109298 | A1 | 4/2017 | Kurita et al. |
| 2017/0339062 | A1* | 11/2017 | Mayer-Wolf .......... H04L 47/29 |
| 2018/0013677 | A1 | 1/2018 | Tang et al. |
| 2018/0184326 | A1 | 6/2018 | Ben-Haim et al. |
| 2018/0198715 | A1* | 7/2018 | Shmilovici ............. H04L 45/66 |
| 2018/0316613 | A1* | 11/2018 | Gafni ..................... H04L 45/44 |
| 2018/0343206 | A1 | 11/2018 | White et al. |
| 2019/0075486 | A1* | 3/2019 | Welin ................. H04L 47/2483 |
| 2019/0089644 | A1 | 3/2019 | Shpiner et al. |
| 2019/0280978 | A1 | 9/2019 | Schmatz et al. |
| 2019/0280982 | A1 | 9/2019 | Shiraki |
| 2019/0386924 | A1 | 12/2019 | Srinivasan et al. |
| 2020/0053745 | A1 | 2/2020 | Luo et al. |
| 2020/0084155 | A1 | 3/2020 | Song et al. |
| 2020/0145349 | A1 | 5/2020 | Menachem et al. |
| 2020/0351756 | A1 | 11/2020 | Jager et al. |
| 2021/0051102 | A1 | 2/2021 | Dong et al. |
| 2021/0152474 | A1 | 5/2021 | Shpigelman et al. |
| 2022/0279055 | A1 | 9/2022 | Bosshart |

FOREIGN PATENT DOCUMENTS

| | | | | |
|---|---|---|---|---|
| EP | | 1805524 B1 | 5/2013 | |
| EP | | 3461082 A1 | 3/2019 | |
| EP | | 2615802 B1 | 4/2019 | |
| JP | | H06209330 A1 | 5/1995 | |
| KR | | 20120105321 A | * 9/2012 | |
| WO | | 2016000842 A1 | 1/2016 | |
| WO | | WO-2017146620 A1 | * 8/2017 | .............. H04L 47/11 |

OTHER PUBLICATIONS

"WRED (Weighted Random Early Detection)", Cisco NetworkLessons. com, https://networklessons.com/cisco/ccie-routing-switching-written/wred-weighted-random-early-detection, © 2013-2022 NetworkLessons.com, 4 pages.

Barak, Dotan, "RDMAmojo ibv_modify_qp()", https://www.rdmamojo.com/2013/01/12/ibv_modify_qp/, Jan. 12, 2013, 15 pages.

Floyd, Sally, et al., "Random Early Detection Gateways for Congestion Avoidance", To appear in the Aug. 1993 IEEE/ACM Transactions on Networking, 32 pages.

"In-band Network Telemetry (INT) Dataplane Specification", Version 2.0, the P4.org Applications Working Group, https://github.com/p4lang/p4-applications/blob/master/docs/INT_v2_0.pdf, Feb. 14, 2020, 66 pages.

Advisory Action for U.S. Appl. No. 16/517,358, Mailed Jul. 20, 2022, 3 pages.

Alizadeh, Mohammad, et al., "Data Center TCP (DCTCP)", https://web.stanford.edu/class/ee384m/Handouts/handout16.pdf, May 14, 2011, 25 pages.

Asaf Samuel et al., "Routing Keys", 2017 IEEE 25th Annual Symposium on High-Performance Interconnects (HOTI), Aug. 2017, 8 pages.

Baker, F., "Requirements for IP Version 4 Routers", Network Working Group, https://datatracker.ietf.org/doc/html/rfc1812, Jun. 1995, 350 pages.

Braden, R., "Requirements for Internet Hosts—Communication Layers", Network Working Group, https://datatracker.ietf.org/doc/html/rfc1122, Oct. 1989, 232 pages.

(56) References Cited

OTHER PUBLICATIONS

Brockners, F., et al., "Data Fields for In-situ OAM", https://datatracker.ietf.org/doc/html/draft-ietf-ippm-ioam-data-09, Mar. 8, 2020, 86 pages.
Cisco, "Hierarchical Queuing Framework", White Paper, 2008 Cisco Systems, Inc., Jul. 2008, 9 pages.
Davide Bergamasco, "Data Center Ethernet Congestion Management: Backward Congestion Notification", Cisco Systems, Inc., IEEE 802.1 Interim Meeting, Berlin, Germany, May 12, 2005, 25 pages.
Extended European Search Report for Patent Application No. 20164676.7, Mailed Nov. 4, 2020, 10 pages.
Fei Chen et al., "Data Center Congestion Management requirements", Huawei Technologies Co. Ltd., Jul. 2019, 9 pages.
Feldmann, Anja, et al., "P4-enabled Network-assisted Congestion Feedback: A Case for NACKs", © 2019 Association for Computing Machinery, http://buffer-workshop.stanford.edu/papers/paper6.pdf, BS'19, Dec. 2-3, Stanford, CA, 7 pages.
Final Office Action for U.S. Appl. No. 16/517,358, Mailed Mar. 15, 2022, 25 pages.
First Office Action for U.S. Appl. No. 16/517,358, Mailed Sep. 17, 2020, 18 pages.
Gont, F., "Deprecation of ICMP Source Quench Messages", Internet Engineering Task Force (IETF), May 2012, 16 pages.
Hollot, C. V., et al., "On Designing Improved Controllers for AQM Routers Supporting TCP Flows", Proceedings IEEE Infocom 2001, Conference on Computer Communications, Twentieth Annual Joint Conference of the IEEE Computer and Communications Society (Cat. No. 01CH37213), Apr. 22-26, 2001, 9 pages.
Huawei, "CloudEngine Is the Foundation of the Intent-driven Network", Huawei CloudEngine Series Switches Technical Presentation, Copyright © 2018 Huawei Technologies Co., Ltd., 28 pages.
International Search Report and Written Opinion for PCT Patent Application No. PCT/US21/52106, Mailed Jan. 17, 2022, 11 pages.
International Search Report and Written Opinion for PCT Patent Application No. PCT/US22/22042, Mailed Jul. 18, 2022, 10 pages.
James McCauley et al., "Thoughts on Load Distribution and the Role of Programmable Switches", ACM SIGCOMM Computer Communication Review, vol. 49 Issue 1, Jan. 2019, 6 pages.
K. Ramakrishnan et al., "The Addition of Explicit Congestion Notification (ECN) to IP", TeraOptic Networks, EMC, Sep. 2001, 64 pages.
Kumar, J., et al., "Inband Flow Analyzer", https://datatracker.ietf.org/doc/html/draft-kumar-ippm-ifa-01, Feb. 21, 2019, 74 pages.
Lee, Jeongkeun, "Advanced Congestion & Flow Control with Programmable Switches", Expert Roundtable Series hosted by ONF, Apr. 28-29, 2020, 10 pages.
Li, Yuliang, et al., "HPCC: High Precision Congestion Control", SIGCOMM '19, Aug. 19-23, 2019, Beijing, China, © 2019 Association for Computing Machinery, 15 pages.
Maor, Ophir, "RoCEv2 CNP Packet Format Example", Mellanox, https://support.mellanox.com/s/article/rocev2-cnp-packet-format-example, published Dec. 5, 2018, 3 pages.
Mohammad Alizadeh et al., "Data Center Transport Mechanisms: Congestion Control Theory and IEEE Standardization", 46th Annual Allerton Conference, Illinois, USA, Sep. 2008, 8 pages.
Pan, Rong, et al., "PIE: A Lightweight Control Scheme to Address the Bufferbloat Problem", 2013 IEEE 14th International Conference on High Performance Switching and Routing (HPSR), Jul. 8-11, 2013, 8 pages.
Postel, J., "Internet Control Message Protocol DARPA Internet Program Protocol Specification", Network Working Group, https://datatracker.ietf.org/doc/html/rfc792, Sep. 1981, 42 pages.
Second Office Action for U.S. Appl. No. 16/517,358, Mailed Jun. 1, 2021, 21 pages.
TechLibrary, "Data Center Quantized Congestion Notification (DCQCN)", Juniper Networks, Inc., Oct. 4, 2018, 8 pages.
Third Office Action for U.S. Appl. No. 16/517,358, Mailed Oct. 28, 2021, 22 pages.
Transition Networks, The Conversion Technology Experts, "Quality of Service (QoS) in High-Priority Applications", www.transition.com/ . . . /uploads/2016/05/qos_wp.pdf, 2016, 12 pages.
U.S. Appl. No. 15/835,238, filed Dec. 7, 2017, 69 pages.
U.S. Appl. No. 15/835,239, filed Dec. 7, 2017, 69 pages.
U.S. Appl. No. 15/835,242, filed Dec. 7, 2017, 69 pages.
U.S. Appl. No. 15/835,249, filed Dec. 7, 2017, 69 pages.
William Stallings, "Quality of Service (QoS) for Local Area Networks (LANs)", informIT, Prentice Hall, Feb. 15, 2002, 4 pages.
International Search Report and Written Opinion for PCT Patent Application No. PCT/US22/42382, Mailed Dec. 22, 2022, 11 pages.
Fairhurst, Gorry and Welzl, Michael, RFC: 8087, "The Benefits of Using Explicit Congestion Notification (ECN)", https://datatracker.ietf.org/doc/html/rfc8087, Mar. 2017, 19 pages.
Intel White Paper, "In-band Network Telemetry Detects Network Performance Issues", Dec. 2020, 5 pages.
First Office Action for U.S. Appl. No. 17/482,822, Mailed Mar. 18, 2024, 18 pages.
Kim et al., "In-band Network Telemetry via Programmable Dataplanes", ACM SIGCOM M Symposium on SON Research, 2015.
Li et al. "HPCC: High Precision Congestion Control" SIGCOMM 2019, Proceedings of the ACM Special interest Group on Data Communication, Aug. 2019, pp. 44-58.
Pan et al., "INT-path: Towards Otimalo Path Planning for In-band Network-Wide Telemetry", Infocom 2019, IEEE Conference on Computer Communications, Apr. 29, 2019.
First Office Action for U.S. Appl. No. 17/359,533, Mailed Nov. 29, 2023, 28 pages.
Final Office Action for U.S. Appl. No. 17/482,822, Mailed Sep. 29, 2024, 17 pages.
Final Office Action for U.S. Appl. No. 17/359,533, Mailed May 10, 2024, 66 pages.
First Office Action for U.S. Appl. No. 17/667,415, Mailed Sep. 11, 2024, 15 pages.
First Office Action for U.S. Appl. No. 17/839,393, Mailed Nov. 21, 2024, 21 pages.
Kadhum et al., "Fast Congestion In Notification Mechanism for ECN-Capable Routers", International Symposium on Information Technology, 2008 IEEE, Aug. 26, 2008, 6 pages.
Yan et al, "ACC: Automatic ECN Tuning for High-Speed Datacenter Networks", Proceedings of the 201 ACM Sigcomm 2021 Conference, Aug. 9, 2021, pp. 384-397, 14 pages.
Advisory Action for U.S. Appl. No. 17/359,533, Mailed Aug. 30, 2024, 3 pages.
Salim, Jamal Hadi and Ahmed, Uvaiz, "Performance Evaluation of Explicit Congestion Notification (ECN) in IP Networks", RFC: 2884, Jul. 2000, 18 pages.

* cited by examiner

| |
|---|
| MAC Header |
| IPv4/IPv6 Header |
| UDP Header |
| BTH |
| DestQP set to QPN for which the RoCEv2 CNP is generated |
| Opcode set to b'10000001 |
| PSN set to 0 |
| SE set to 0 |
| M set to 0 |
| P_Key set to the same value as in the BTH of the ECN packet marked |
| |
| (16 bytes) - Reserved. MUST be set to 0 by sender. Ignored by receiver |
| ICRC |
| FCS |

FIG. 4

CONGESTION MANAGEMENT TECHNIQUES

RELATED APPLICATION

The present application claims the benefit of a priority date of U.S. provisional patent application Ser. No. 62/967,003, filed Jan. 28, 2020, the entire disclosure of which is incorporated herein by reference.

DESCRIPTION

Data centers provide vast processing, storage, and networking resources to users. For example, smart phones or internet of things (IoT) devices can leverage data centers to perform data analysis, data storage, or data retrieval. Data centers are typically connected together using high speed networking devices such as network interfaces, switches, or routers. Congestion can occur whereby a receive port or queue used by a data center receives more traffic than it can transfer for processing and the port or queue overflows. Identifying a cause of congestion can be time consuming and lead to slow resolution of congestion.

BRIEF DESCRIPTION OF THE DRAWINGS

FIG. 4 depicts an example header format of a source quench packet.

DETAILED DESCRIPTION

Network congestion control is a distributed system problem. A congestion event can occur somewhere in the middle of network and the congestion information can be disseminated to the senders of the traffic contributing to the congestion. Some network congestion control schemes embed congestion information on the forward direction data packets and forward the data packets to the destination, experiencing large feedback delay impacted by the on-going congestion.

Figure 1:
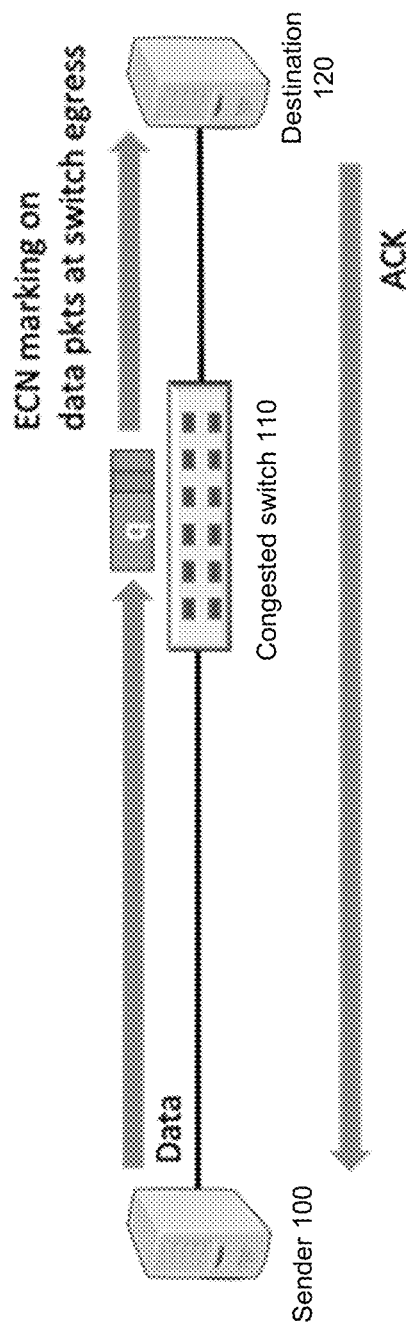
FIG. 1 depicts an example of use of Explicit Congestion Notification (ECN).

FIG. 1 depicts an example of use of Explicit Congestion Notification (ECN). A network device (e.g., switch 110 in a datacenter context) experiences congestion and marks a bit on the data packet's ECN field, which can be part of an IP protocol header. Depending on an implementation, the marking can be performed prior to the enqueuing of the data packet into the congested queue (e.g., at switch ingress) or performed after the packet is dequeued from the congested queue (e.g., at switch egress). In either case, after the ECN-marked data packet reaches destination 120, destination 120 sends congestion information to sender 100 via a separate acknowledgement (ACK) packet or marking on a reverse-direction data packet. Sender 100 can react to the congestion information in a variety of ways such as, but not limited to, pausing packet transmission to the congested switch 110. Regardless of where the congestion information is made (e.g., switch ingress or egress), end-to-end congestion (e2e) feedback delay in notifying sender 100 of congestion can prolonged at least by on-going congestion queueing delay (e.g., time the packet is enqueued prior to transmission to destination 120).

Congestion feedback delay can be decomposed into two parts: (1) feedback generation delay (Tg) (e.g., the time taken for a feedback signal to be generated (e.g., ECN marking) for a given sender) and (2) feedback forwarding delay (Tf) (e.g., the time taken for the signal to be eventually forwarded from destination 120 to sender 100 since the generation of the feedback signal). Assuming the ECN marking is performed at switch egress (post queueing), the e2e feedback delay can be expressed as:

$$e2e \text{ feedback delay} = \text{feedback generation delay } (Tg) + \text{feedback forwarding delay } (Tf)$$

where
Tg=time[sender, switch egress]=time[sender, switch ingress]+congestion queuing delay,
Tf=time[switch egress, sender]=time[switch egress, receiver]+time[receiver, sender], and
time[A,B] indicates the time needed for a packet departing point A to reach point B.

In some cases, a queueing delay of a highly congested queue in a datacenter switch can go up to several milliseconds, which is 2-3 orders of magnitude higher than some datacenter networks' baseline round trip time (RTT) (e.g., RTT without congestion delay, can be around 10 microseconds or less). In case ECN marking is performed at switch ingress, the congestion queuing delay would be part of Tf instead of Tg. In any case, the high congestion queuing delay is a major part of the e2e feedback delay Tg+Tf.

Some solutions attempt to reduce feedback forwarding delay (Tf) by generating notification packets from the egress of a congested switch back to senders, but can experience relatively high queueing delay as part of feedback generation delay, as data packets traverse through a congested queue and eventually the egress pipe of the switch before the notification is sent to the sender.

Measuring RTT as a congestion signal can provide slow feedback delay by design. Due to the large feedback delay and slow reaction to congestion, IEEE 802.1 provides a hop-by-hop flow control scheme, where a congested switch pushes back to its immediate upstream switches (e.g., via Priority Flow Control (PFC)) to pause their transmissions. PFC works in a relatively small scale, but can introduce Head-of-Line blocking (e.g., hurting fairness) and PFC storm (e.g., limiting network scale).

Quantized Congestion Notification (QCN) is another IEEE 802.1 standard that generates Congestion Notification Packet (CNP) from a congested switch. This can be applied to layer 2 network and the implementations generate CNPs from switch egress and sends CNPs back to the senders. Hence use of QCN can reduce the feedback forwarding delay compared to ECN-based schemes that reflects ECN marking information through a receiver back to the sender, but the CNP generation delay of QCN can experience long queuing delay if CNP is generated post dequeuing at switch egress.

Various embodiments provide source quench commands or congestion notification with specification of a congested network element and suggested behaviors for one or more senders. A congested network element can generate and send a congestion message (e.g., Source Quench Packet (SQP)) in response to prediction of congestion in a queue to which a packet is to be stored. In some embodiments, an SQP can be generated from ingress (prior to enqueue event) of a network element and sent to one or more senders of packets that would be stored in a congested queue. Generating SQP at ingress prior to storage of the received packet in a queue can remove or reduce queuing delay from end-to-end congestion feedback. A network element can track queue depth and generate an SQP in response to receipt of an incoming data packet based on a probabilistic function that predicts that congestion is likely to occur and predicts an amount of time that a sender is to pause sending packets that would be stored in the queue in order for the queue to drain to an uncongested target queue depth.

In some examples, an SQP can carry at least (1) an estimated pause time associated with draining the congested queue to the target queue depth and (2) the destination IP address of the packet that experienced or caused the queue congestion. In response to receipt of an SQP, the traffic sender can pause its transmission towards the congested destination IP address for the specified duration of pause time. In some examples, in response to receipt of an SQP, the traffic sender can reduce its transmission rate towards the congested destination IP address for the specified duration of pause time.

Various embodiments can reduce congestion message overhead in a network and reduce congestion message feedback delay. By providing an accurate pause time for a sender, various embodiments can potentially avoid packet drops at a congested queue and reduce packet transmission delay due to congested queue. Network elements (e.g., a network interface, switch, virtual switch (e.g., a smart network interface card configured as a switch and/or a switch coupled to a server that executes one or more containers or virtual machines to process packets), network interface card (NIC), smart NIC, router, server, interconnect, fabric, or any communications device) can provide improved network performance, higher throughput and lower delay, to customer applications and can drastically improve the scale limit of remote direct memory access (RDMA) solutions.

For example, elephants flows (e.g., large flows), mice flows (e.g., small flows) sharing a same congested port and queue can experience tail drops or ECN marking. By use of an accurate specification of pause time, occurrences of head of line blocking for flows sharing the same link (or queue) from an upstream network element to the congested network element can be reduced compared to use of Priority-based Flow Control (PFC) or pause-based Xon/Xoff.

Figure 2A:
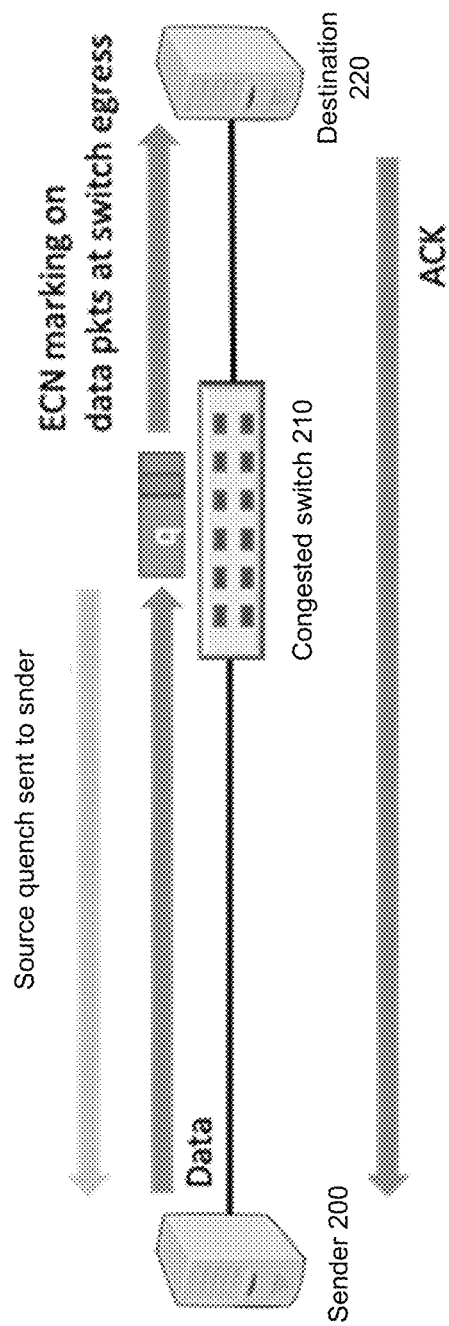
FIG. 2A depicts an example system.

FIG. 2A depicts an example system. At a congested switch 210, for a received packet, prediction of congestion of an output queue from which the packet is to be transmitted is determined. If congestion is predicted to occur in an output queue, at least one SQP is generated at ingress of switch 210 (e.g., prior to or at overlapping time with enqueue portion of packet) and switch 210 sends at least one SQP to sender 200. Note that reference to switch 210 can refer to any type of network element. Generating an SQP at ingress can remove or reduce queuing delay compared to when end-to-end congestion feedback is used whereby congestion at a network element along a path to a destination receiver 220 is indicated to a sender by the destination receiver network element 220. An SQP can be sent without having to wait until the packet that experienced congestion is dequeued if the SQP generation occurred at packet egress. SQP can be sent to sender 200 of the original data packet while the original data packet can be sent to its specified destination. In some examples, an egress port used to send the SQP can be uncongested and the SQP can be placed in a high priority queue.

An ingress pipeline of switch 210 can track queue depths and predict queue congestion is to occur for a queue in which the packet is to be stored and predict an estimated time associated with draining the congested queue to a target queue depth. An ingress pipeline of switch 210 can generate an SQP for an incoming data packet to indicate to a sender an amount of time to pause transmission or reduce transmission rate. A probabilistic Proportional-Integral (PI) control algorithm can take input of depth of a queue that the data packet is forwarded into to compute a probability of queue congestion. PI or its variants (e.g., Proportional Integral Controller Enhanced (PIE)) can consider current absolute queue depth but also a gradient of queue depth changes over time in computing the probability that a congestion will occur. See, for example, "On Designing Improved Controllers for AQM Routers Supporting TCP Flows," Infocom 2001 and "Proportional Integral Controller Enhanced (PIE): A Lightweight Control Scheme to Address the Bufferbloat Problem," HPSR 2013. For example, considering a gradient of queue depth changes can enable a rapid and timely reaction to rising many-to-one incast congestion. PI and its variants can be applied to perform early detection of packet drop or ECN marking of data packets. Other schemes can use simpler mechanisms such as threshold-based SQP generation whereby if a queue depth is at or above a congestion threshold, the ingress pipeline of switch 210 informs a sender of a packet to the queue that the queue is congested and indicates a time to pause transmission. To predict an estimated time associated with draining the congested queue to a target queue depth, switch 210 can use a scheme described with respect to FIG. 3.

In some examples, switch 210 can send the SQP to a source IP address of a packet that is to be stored in a queue considered congested or is likely to be congested. In accordance with various embodiments, the SQP can include an identifier of an IP address of network element at which congestion occurred (e.g., switch ID of switch 210 and corresponding congested port and queue number) and/or an endpoint destination of the packet (e.g., IP address of destination 220). The pause or reduction of transmission rate could be tied to transmission of packets associated with one or more of: destination IP address, flow, traffic class, switch ID, queue identifier, port identifier or any other classification. Quality of service (QoS) or active queue management (AQM) can be applied by sender 200 or switch 210 based on congestion information. Switch 210 can add an ECN marking to a packet prior to sending to a destination 220. Based on receipt of the packet, destination 220 can send an ACK to sender 200.

Sender 200 can react to receipt of an SQP by pausing transmission of traffic to the congested device switch 210 or endpoint destination 220 for an amount of time specified in the SQP and thereafter resume sending packets to the switch 210. In some examples, sender 200 can react to receipt of an SQP by reducing a rate of transmission of traffic to the congested device switch 210 or endpoint destination 220 for an amount of time specified in the SQP and thereafter resume packet transmission rate to switch 210.

Figure 2B:
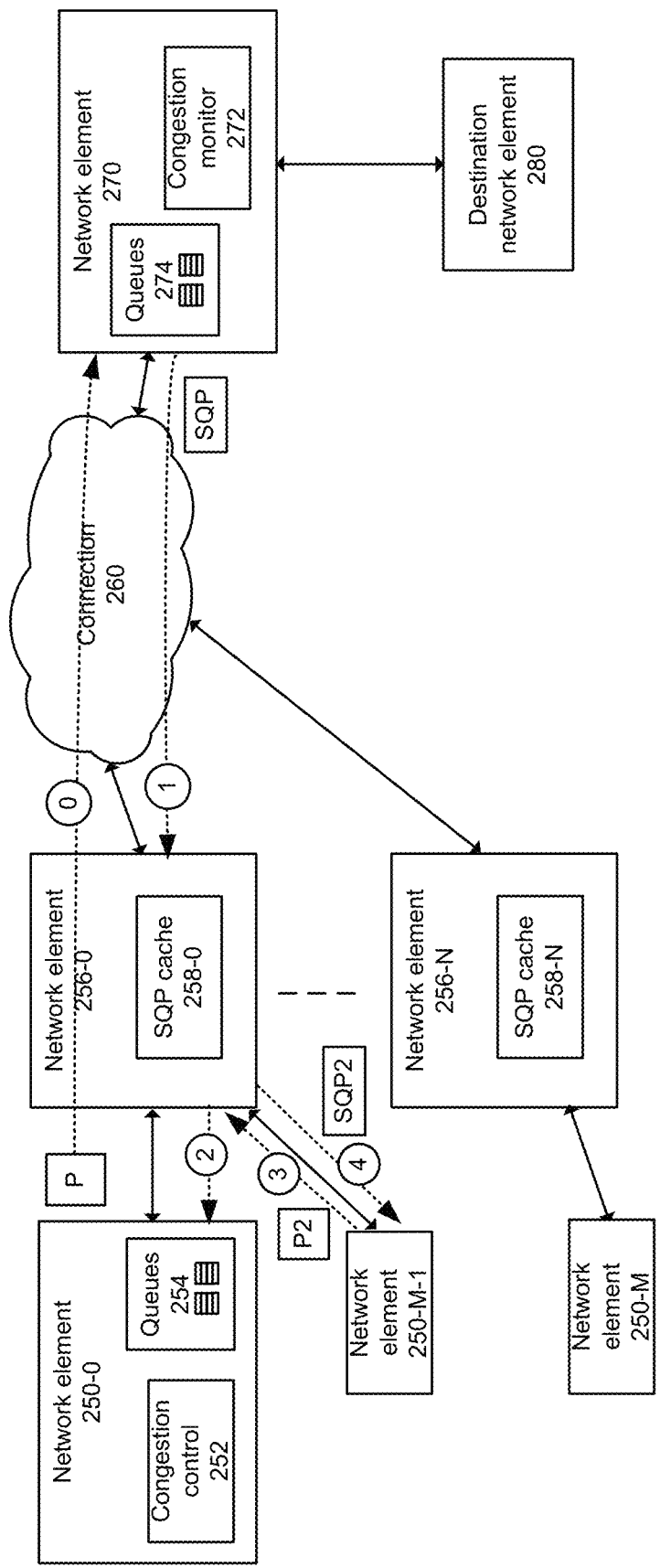
FIG. 2B depicts an example system.

FIG. 2B depicts an example system. In this example, network element 250-0 sends one or more packets to endpoint network element 280 through network element 256-0, connection 260, and network element 270. Network element 270 can detect congestion and generate an SQP in accordance with various embodiments. In some examples, an SQP can carry 1) a pause time to drain the congested queue down to a target queue depth and a 2) destination IP (e.g., IP address of destination network element 280).

For example, congestion can be found based on one or more of: overflow of packets at an ingress port, overflow of packets at an egress queue, overflow of packets at an egress port, incast level exceeding a threshold (e.g., more traffic to egress port than egress port can handle), packet drop rate in a transmit pipeline such as egress queues 274 or intermediate queues that feed egress queues 274, bandwidth limit being exceeded, or queue depth exceeded. An egress queue 274 can be used to store packets associated with an egress port prior to transmission of the packets through the egress port. At an ingress pipeline and prior to queueing of the packet in an egress queue 274 for transmission to another network element, congestion monitor 272 can predict queue congestion in a similar manner as described with respect to switch 210 (FIG. 2A) such as by use of a probabilistic Proportional-Integral (PI) control algorithm that takes input of depth of a queue that the data packet is forwarded into to compute a probability of queue congestion. In some examples, at an ingress pipeline and prior to queueing of the packet in an ingress queue associated with an ingress port, congestion monitor 272 can predict ingress queue congestion in a similar manner as described with respect to switch 210 (FIG. 2A). Congestion monitor 272 can predict or determine whether a queue has a fill level that is too high (e.g., at or above a static or adjustable threshold level) and identify if the packet that is to be stored in the queue would cause congestion whereby a fill level of a queue meets or exceeds a threshold. The packet could be used to identify an endpoint transmitter that transmitted the packet to be stored in a congested queue, for example using a source IP address and source MAC address specified in the packet to be stored in a congested queue. In response to detecting congestion, congestion monitor 272 could cause an SQP to be formed and placed in an uncongested queue to egress for transmission to network element 250-0. In some examples, a configuration indicator, setting or file from a local or remote control plane can configure congestion monitor 272 to cause an SQP to be formed prior to storage of the packet in an ingress or egress queue and the SQP placed in an uncongested queue to egress for transmission to network element 250-0 or to cause an SQP to be formed after storage of the packet in an ingress or egress queue and the SQP placed in an uncongested queue to egress for transmission to network element 250-0.

For example, congestion monitor 272 can track the following information for a flow to predict whether the packet will reach a congested queue and determine a pause time to be applied by network element 250-0 for other packets in the same flow. The information associated with the relationship described with respect to FIG. 3 can be stored in a state table associated with a match table. For example, the following parameters can be tracked.

| Congestion identifier (e.g., destination IP address, flow, traffic class, switch ID, queue identifier, port identifier) | Current queue depth | Slope | Desired queue depth | Drain rate at egress |
|---|---|---|---|---|

In some embodiments, a match action unit of an ingress pipeline of network element 270 can determine whether to generate an SQP for a received packet by performing a match of a congestion identifier of a packet with an action that indicates calculation of queue congestion for which the packet is to be stored. For example, a stateful table can store present queue level of a queue that the packet is to be stored as well as prior queue levels of the same queue. An MAU can calculate a slope of the based on the current and one or more prior levels and determine a predicted congestion time. In addition, an MAU can determine a predicted time to pause transmission of the packets that are to be stored at the queue in order for the queue to drain to an acceptable level.

Network element 270 can enqueue the received packet in the congested queue for transmission to destination network element 280. Network element 270 can provide ECN related information to notify destination network element 280 of congestion. Destination network element 280 can deliver congestion information to senders via ACK messages or NACK messages.

A packet may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer model.

A flow can be a sequence of packets being transferred between two endpoints, generally representing a single session using a known protocol. Accordingly, a flow can be identified by a set of defined tuples and, for routing purpose, a flow is identified by the two tuples that identify the endpoints, e.g., the source and destination addresses. For content based services (e.g., load balancer, firewall, Intrusion detection system etc.), flows can be discriminated at a finer granularity by using N-tuples (e.g., source address, destination address, IP protocol, transport layer source port, and destination port). A packet in a flow is expected to have the same set of tuples in the packet header.

A packet flow to be controlled can be identified by a combination of tuples (e.g., Ethernet type field, source and/or destination IP address, source and/or destination User Datagram Protocol (UDP) ports, source/destination TCP ports, or any other header field) and a unique source and destination queue pair (QP) number or identifier.

Based on receipt of an SQP, network element 250-0 can pause its transmission of packets towards the congested device (e.g., destination network element 280 or a congested queue or port of network element 270) for the specified duration of pause time in the SQP. For example, congestion control 252 can perform pausing of transmission of packets to network element 270 for the pause time. In some examples, a source device can reduce a transmit rate to the congested queue. For example, a first receipt of an SQP for a flow can cause the transmission rate to decrease by X %, and subsequent receipts of SQP for a flow can cause the transmission rate to decrease by larger amounts.

Various embodiments can reduce SQP transmission bandwidth used in a network by potentially sending fewer SQP messages, and to potentially further reduce delay in providing congestion notification. Various embodiments provide stateful suppression to send a single SQP to a sender during a specified amount of time. A congested network element can use a per-sender table that identifies each active sender and a timestamp for each sender where the timestamp indicates a future time calculated from a summation of the last time an SQP was generated or sent to a sender and the pause time duration carried in the most recently sent SQP. Further SQP generation back to the sender can be suppressed until the current time passes the timestamp. For example, the following table provides an example manner of tracking when another SQP can be sent to a sender by use of a resend suppression time.

| Sender | Most recent time SQP sent | Pause time | Resend suppression time |
|---|---|---|---|
| 0000 0000 | 00000000100 | 00000001000 | 00000001100 |
| 0000 0001 | 00000010000 | 00000001000 | 00000011000 |

In some scenarios, an SQP is not received by a sender (e.g., lost or dropped packet). To manage lost SQP, a network element ingress pipeline can implement additional intelligence that tracks a resend timestamp per sender. The resend timestamp can be computed as [baseline RTT (congestion-free RTT)+delta+the last time an SQP generated for the sender]. If a data packet arrives from the sender passing the second timestamp, this may indicate the previous SQP got lost and the sender has not paused transmission and the network element with a queue predicted to be congested can send another SQP to the sender even though the first timestamp (e.g., resend suppression time) has not passed yet. Resend suppression and resend timestamps can be updated when a new SQP is generated or sent.

In some examples, two (or other number of) bloom-filters can be used to record a set of senders for which SQPs have been recently generated for or sent to and the bloom filters are reset in a staggered way. A bloom-filter reset interval, the number of bloom-filters and the staggering schedule can be decided to approximate a target suppression time. For example, the target suppression time can be set to be [the baseline RTT+delta] so that a new SQP will be generated if the previous SQP was not received by the sender.

In addition to pausing transmission to a network element with a congested queue, or alternatively, a source device can perform congestion control. The packets are queued up in the congested switch may eventually drain and carry ECN or other congestion signal to a receiver, and to senders. While the senders are paused by SQPs, they can also receive ACKs from receivers and learn about the on-going congestion. When the pause time expires, the senders can resume their transmissions based on the new transmit rate set by their congestion control algorithms. Any type of congestion control algorithm can be used.

In some examples, a sender pause time could be set not to completely drain the congested queue but to drain only down to the target (or reference) queue depth used by congestion control schemes. For example, ECN marking algorithms (such as random early detection (RED) or Proportional-Integral (PI)) can include target queue depth as part of parameter configurations. If the SQP pause time is set too long and drains the queue below the target queue depth, the link utilization may go below 100%, hurting application throughput.

In some examples, the retransmission timer used by the congestion control algorithm can be fine-grained adjusted by the SQP pause time. Using SQP, one or more senders can be notified of on-going network congestion within a baseline RTT. A default retransmit timer can be set relatively small but larger than the SQP generation threshold (e.g., a multiple of RTT), such that senders can learn about packet drops caused by corruption or failure. Upon reception of SQPs, senders use the pause time to accurately increase retransmit timer for the packets that have been sent to the congested destination IP address, in order to avoid unnecessary Retransmission Time Out (RTO).

In some examples, SQP can carry additional information to help congestion control schemes to decide the transmission rate (or window size in the case of TCP) to use when the pause ends. For example, the congested network element can measure the accurate number of concurrent senders contributing to the congestion and embed the information of number of concurrent senders contributing to the congestion in SQPs. A window size can range from 1× baseline RTT to a multiple of RTTs, but large enough to determine at least one packet from each sender in thousands of concurrent flows/messages. Additionally, the incast ratio (e.g., total traffic arrival rate divided by the line rate) can be provided in SQPs as the lower bound of the number of competing senders.

Some embodiments provide for propagating the congested queue depth information to other upstream network elements (e.g., standalone switches, switches in network interface cards, virtual switches, network interface cards, smart network interface cards) in the network to cache the pause time information (e.g., SQP cache 258-0 of network element 256-0 to SQP cache 258-N of network element 256-N), such that an SQP can be generated at network elements closer to senders. Various embodiments can further reduce feedback generation and forwarding delay. An upstream network element (e.g., SQP cache 258-0 of network element 256-0 to SQP cache 258-N of network element 256-N) stores a mapping of the congested destination IP address to a "pause-until timestamp" computed as [SQP's pause time+current timestamp]. This information can be installed at ingress of upstream network elements. If any data packet destined to the congested destination IP address arrives at the network element prior to the pause-until timestamp, the network element generates an SQP and sends the SQP to the sender of the data packet. Network elements that cache congestion information are placed in-between packet senders and the congested network element 270 so that packets sent from different senders (e.g., network elements 250-M−1 or 250-M) can be paused by network elements 256-0 to 256-N sending SQPs instead of waiting for network element 270 to send an SQP.

For example, at (0), network element 270 receives a packet P from network element 250-0. Network element 270 detects congestion at a queue and at (1) sends an SQP to network element 250-0 via network element 256-0 so that at (2) network element 256-0 transfers the SQP to network element 250-0. Network element 256-0 queues portions of the SQP for use to indicate congestion and pause timer information another packet sender to destination network element 280. For example, at (3), network element 250-M−1 can send packet P2 to destination network element 280 via network element 256-0. Network element 256-0 can receive packet P2 and at (4) send an SQP2 to network element 250-M−1 that is similar to the SQP send at (1).

The pause time carried in the SQP can be computed as [pause-until timestamp−current time]. If a data packet towards the destination IP address arrives later than the pause-until timestamp, the network element deletes the cached pause time information entry and replaces the entry.

When a network element receives an SQP for a cached destination IP address, it updates the cached pause-until timestamp using the new pause time in the SQP. An SQP may carry a flag differentiating the origin of the SQP as either the original congested network element or an upstream network element with cache of pause times. SQPs generated by the original congested network elements can be used by other network elements to cache and update the pause time table.

In some examples, SQP may carry maximum pause time duration, which is the maximum pause time among the SQPs triggered by the given data packet throughout the forwarding path from the sender to the given switch. If an SQP has been generated at any upstream switch for the given data packet, a new SQP may be generated if 1) this network element has a congested queue in a path towards the destination IP address, 2) the local suppression logic indicates that a new SQP is to be generated, and 3) the new pause time is larger than the maximum pause time carried by the packet.

Various embodiments propagate the congestion information (destination IP address and pause time) to upstream switches proactively and/or opportunistically. In a proactive manner, a congested switch proactively broadcasts SQP to every other network element in the network. A number of switches can be much smaller than a number of hosts. Proactive broadcast can be used as the network scales and the incast scale is large so that a large number of senders is likely to participate in one incast congestion event. In some cases, senders may not synchronize their transmit starts and there will be some later transmit starts towards the congested destination IP address. The pause time information can be proactively cached in the upstream network elements and pause time information can be used to quench the later-coming senders even before their packets arrive at the congested network element. Proactive broadcast can increase the chance for SQPs generated from the first-hop top of rack (ToR) switches that the late-comers are connected to.

Opportunistic snooping can permit intermediate network elements that forward the original SQPs to learn the destination IP address and pause time from the SQPs and cache the information. SQPs can be generated for late-coming senders whose packet forwarding paths share upstream switches with the original SQPs. Compared to the proactive broadcasting, this approach has a higher chance to generate SQPs from the cached information for spine or core switches as compared to ToR switches).

Connection 260 and any communication between network elements can be compatible or compliant with one or more of: Internet Protocol (IP), Ethernet (IEEE 802.3), remote direct memory access (RDMA), InfiniBand, Fibre-Channel, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, fabric interface, and variations thereof. Data can be copied or stored to virtualized storage nodes using a protocol such as NVMe over Fabrics (NVMe-oF) or NVMe.

Figure 3:
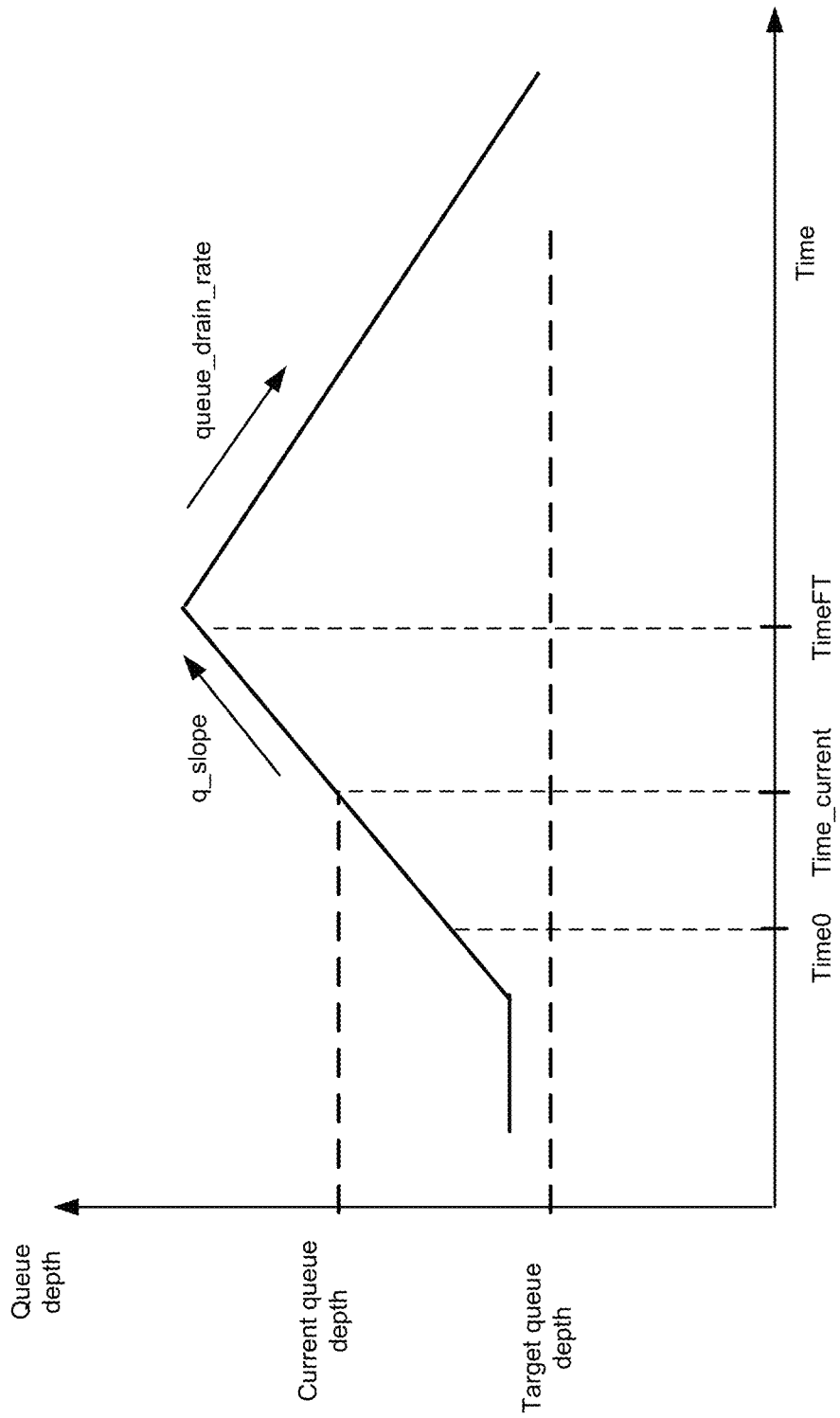
FIG. 3 depicts an example of prediction of pause time duration.

FIG. 3 depicts an example of prediction of pause time duration. For SQP, the predicted value of future queue depth can be used to compute duration of sender pause time. In some examples, sender pause time can be determined from the following relationship:

$$pause\_time = (current\_q + (q\_slope * future\_time) - target\_q) / q\_drain\_rate, \text{ where:}$$

current_q=current queue depth,
q_slope=current slope (e.g., based on changes in queue depth versus time),
future_time (TimeFT)=summation of packet delay from current network element through receiver back to sender and time for sender to receive and react to SQP (e.g., a configuration parameter based on topology and network hardware characteristics),
target_q (Target queue depth)=minimum desired queue depth, and
queue_drain_rate=queue draining rate from packet egress.

In some examples, if target_q=0, the queue is drained and underrun occurs.

FIG. 4 depicts an example header format of a source quench packet. In this example, a Congestion Notification Packet (CNP) of RDMA RoCEv2 (e.g., described at least in Annex A17: RoCEv2 (2014)) can be used to convey SQP information. For example, part of a 16 Byte reserved field can carry SQP information. SQP information can include one or more of: time needed to drain the congested queue down to the target queue depth and destination IP of the original data packet that experienced or caused the congestion.

However, any header format and transport mechanism can be used to convey SQP information. Congestion control schemes such as TCP acknowledgement (ACK) can be used to convey SQP information. Some embodiments use data plane telemetry solutions that allow switches to generate telemetry report packets carrying various metadata. For example, information bearing protocols such as In-band Network Telemetry (INT) (e.g., ONF/P4.org INT v2.0) can be used to convey SQP information. In some examples, telemetry reports can be sent to a remote telemetry collector. For example, packet formats described in Internet Engineering Task Force (IETF) In-situ Operations, Administration, and Maintenance (IOAM) (draft) can be used to convey SQP information. For example, packet formats described in IETF Inband Flow Analyzer (IFA) can be used to convey SQP information.

Some network elements described herein can use a pipeline architecture that includes an ingress pipeline, traffic manager with at least one queue, and egress pipeline. Various embodiments provide queue depth data to an ingress pipeline that processes a received packet so the ingress pipeline can determine if an incoming packet is likely to be stored in a congested queue or cause congestion to a queue and an amount of time to pause a sender of the incoming packet.

Figure 5:
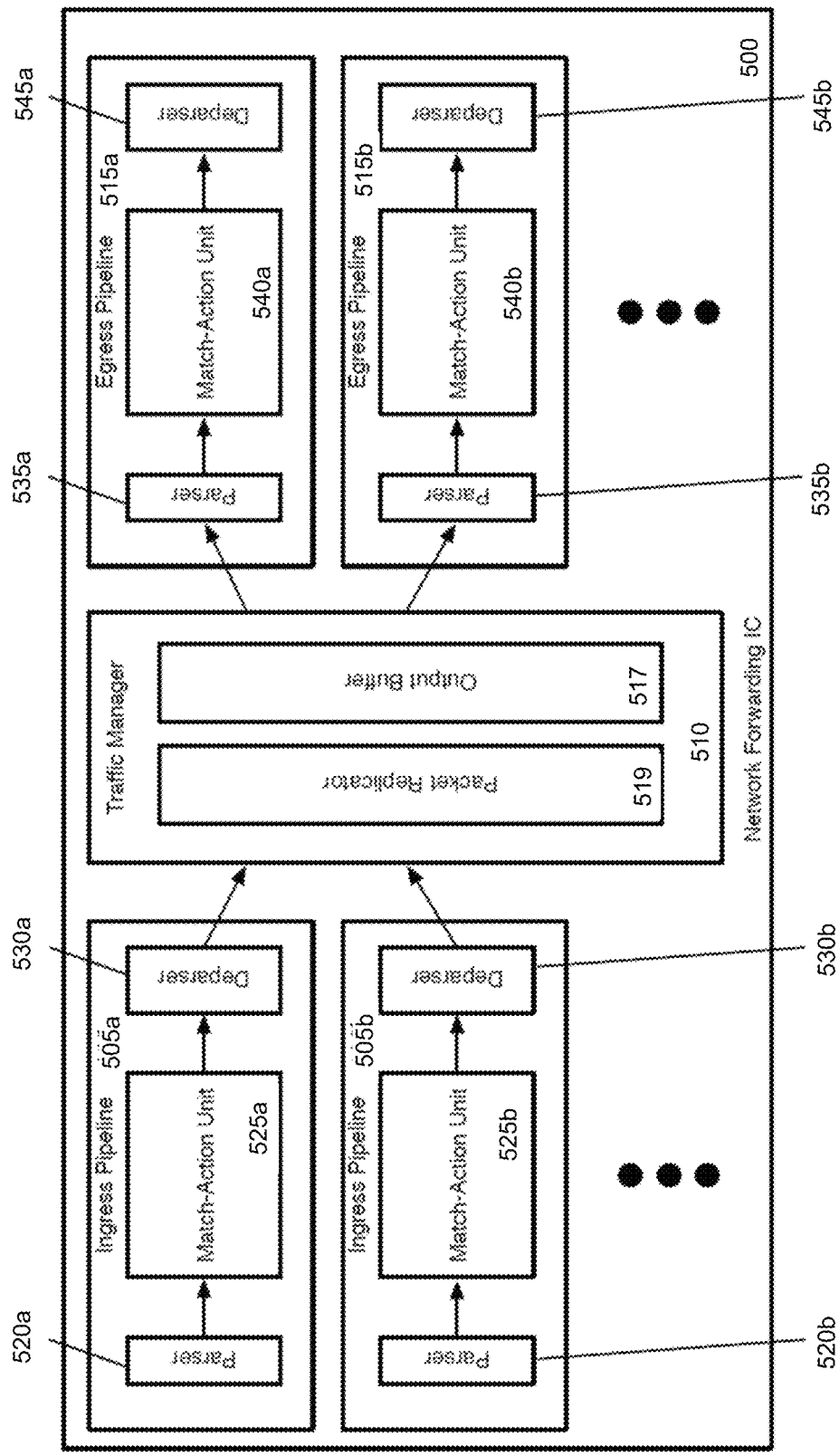
FIG. 5 conceptually illustrates an example network forwarding system.

FIG. 5 conceptually illustrates an example network forwarding system 500. For example, FIG. 5 illustrates several ingress pipelines 505, a traffic management unit (referred to as a traffic manager) 510, and several egress pipelines 515. Though shown as separate structures, in some embodiments the ingress pipelines 505 and the egress pipelines 515 can use the same circuitry resources. In some embodiments, the pipeline circuitry is configured to process ingress and/or egress pipeline packets synchronously, as well as non-packet data. That is, a particular stage of the pipeline may process any combination of an ingress packet, an egress packet, and non-packet data in the same clock cycle. However, in other embodiments, the ingress and egress pipelines are separate circuitry. In some of these other embodiments, the ingress pipelines also process the non-packet data.

In some examples, in response to receiving a packet, network forwarding system 500, the packet is directed to one of the ingress pipelines 505 where an ingress pipeline which may correspond to one or more ports of a hardware forwarding element. After passing through the selected ingress pipeline 505, the packet is sent to the traffic manager 510, where the packet is enqueued and placed in the output buffer 517. In some embodiments, the ingress pipeline 505 that processes the packet specifies into which queue the packet is to be placed by the traffic manager 510 (e.g., based on the destination of the packet or a flow identifier of the packet). The traffic manager 510 then dispatches the packet to the appropriate egress pipeline 515 where an egress pipeline may correspond to one or more ports of the forwarding element. In some embodiments, there is no necessary correlation between which of the ingress pipelines 505 processes a packet and to which of the egress pipelines 515 the traffic manager 510 dispatches the packet. That is, a packet might be initially processed by ingress pipeline 505*b* after receipt through a first port, and then subsequently by egress pipeline 515*a* to be sent out a second port, etc.

A least one ingress pipeline 505 includes a parser 520, a match-action unit (MAU) 525, and a deparser 530. Similarly, a egress pipeline 515 can include a parser 535, a MAU 540, and a deparser 545. The parser 520 or 535, in some embodiments, receives a packet as a formatted collection of bits in a particular order, and parses the packet into its constituent header fields. In some examples, the parser starts from the beginning of the packet and assigns header fields to fields (e.g., data containers) of a packet header vector (PHV) for processing. In some embodiments, the parser 520 or 535 separates out the packet headers (up to a designated point) from the payload of the packet, and sends the payload (or the entire packet, including the headers and payload) directly to the deparser without passing through the MAU processing (e.g., on a single wire).

The MAU 525 or 540 an perform processing on the packet data (e.g., the PHV). In some embodiments, the MAU includes a sequence of stages, with each stage including one or more match tables and an action engine. A match table can include a set of match entries against which the packet header fields are matched (e.g., using hash tables), with the match entries referencing action entries. When the packet matches a particular match entry, that particular match entry references a particular action entry which specifies a set of actions to perform on the packet (e.g., sending the packet to a particular port, modifying one or more packet header field values, dropping the packet, mirroring the packet to a mirror buffer, etc.). The action engine of the stage can perform the actions on the packet, which is then sent to the next stage of the MAU. Example MAU stages are described in more detail below with reference to FIG. 6.

The deparser 530 or 545 can reconstruct the packet using the PHV as modified by the MAU 525 or 540 and the payload received directly from the parser 520 or 535. The deparser can construct a packet that can be sent out over the physical network, or to the traffic manager 510. In some embodiments, the deparser can construct this packet based on data received along with the PHV that specifies the protocols to include in the packet header, as well as its own stored list of data container locations for each possible protocol's header fields.

The traffic manager 510 can include a packet replicator 519 and output buffer 517. In some embodiments, the traffic manager 510 may include other components, such as a feedback generator for sending signals regarding output port failures, a series of queues and schedulers for these queues, queue state analysis components, as well as additional components. The packet replicator 519 of some embodiments performs replication for broadcast/multicast packets, generating multiple packets to be added to the output buffer (e.g., to be distributed to different egress pipelines).

The output buffer 517 can be part of a queuing and buffering system of the traffic manager in some embodiments. The traffic manager 510 provides a shared buffer that accommodates any queuing delays in the egress pipelines. In some embodiments, this shared output buffer 517 can store packet data, while references (e.g., pointers) to that packet data are kept in different queues for each egress pipeline 515. The egress pipelines can request their respective data from the common data buffer using a queuing policy that is control-plane configurable. When a packet data reference reaches the head of its queue and is scheduled for dequeuing, the corresponding packet data can be read out of the output buffer 517 and into the corresponding egress pipeline 515. In some embodiments, packet data may be referenced by multiple pipelines (e.g., for a multicast packet). In this case, the packet data is not removed from this output buffer 517 until all references to the packet data have cleared their respective queues.

Figure 6:
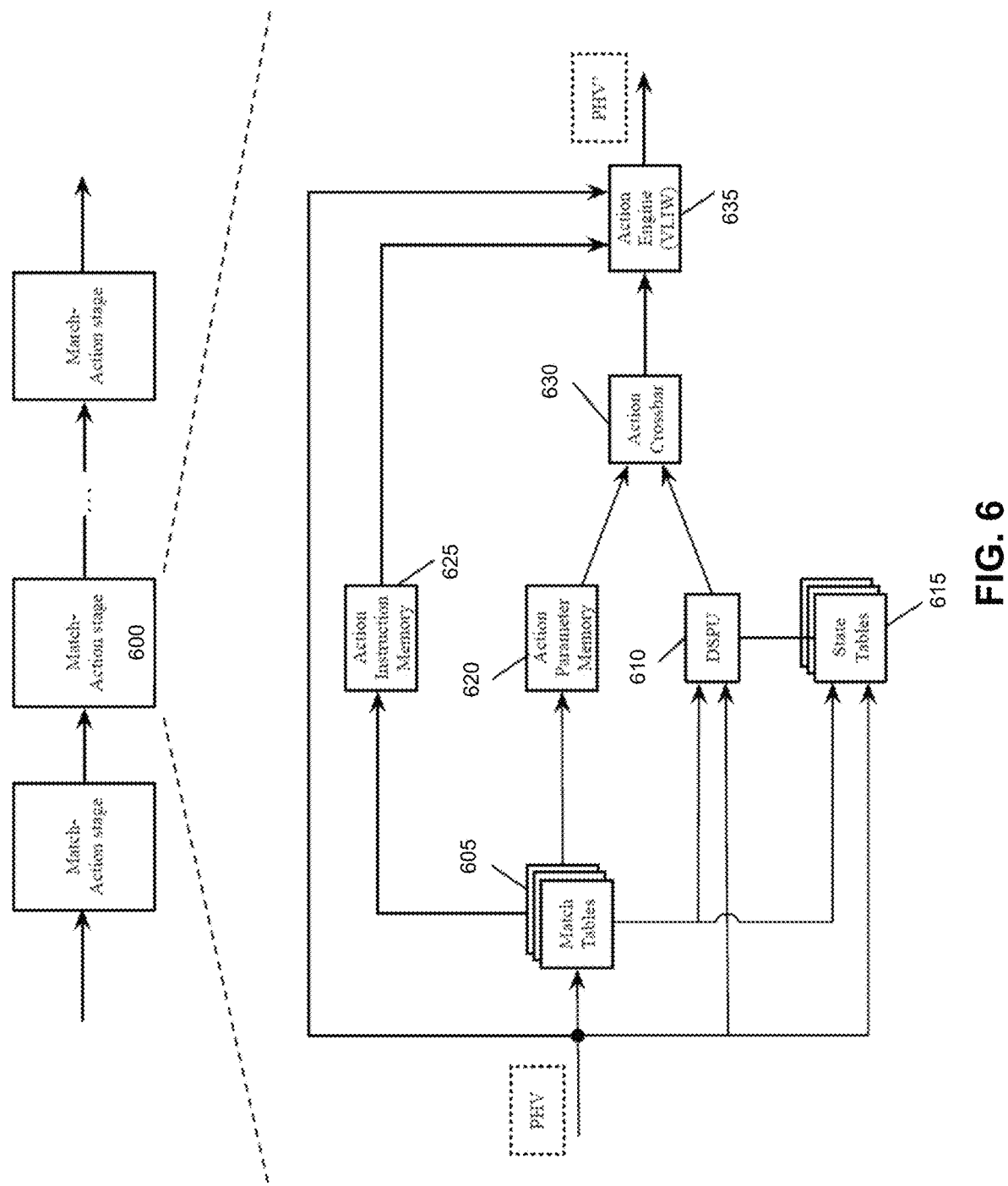
FIG. 6 illustrates an example of a match-action unit of some embodiments.

FIG. 6 illustrates an example of a match-action unit of some embodiments. As mentioned above, a packet processing pipeline of some embodiments can use multiple MAU stages. At least one of the MAUs includes packet-processing circuitry for forwarding received data packets and/or performing stateful operations based on these data packets. These operations can be performed by processing values stored in the PHVs (e.g., the primary PHVs) of the packets.

As shown in FIG. 6, the MAU stage 600 in some embodiments can include a set of one or more match tables 605, a data plane stateful processing unit 610 (DSPU), a set of one or more stateful tables 615, an action crossbar 630, an action parameter memory 620, an action instruction memory 625, and an action engine 635. The match table set 605 can compare one or more fields in a received PHV to identify one or more matching flow entries (e.g., entries that match the PHV). The match table set can be implemented using TCAM tables or exact match tables in some embodiments. In some embodiments, the match table set can be accessed at an address that is a value extracted from one or more fields of the PHV, or it can be a hash of this extracted value.

In some embodiments, the value stored in a match table record that matches a packet's flow identifier, or that is accessed at a hash-generated address, can provide addresses for the action parameter memory 620 and action instruction memory 625. In some cases, such a value from the match table can provide an address and/or parameter for one or more records in the stateful table set 615, and can provide an instruction and/or parameter for the DSPU 610. As shown, the DSPU 610 and the stateful table set 615 can receive a processed PHV. The PHVs can include instructions and/or parameters for the DSPU, while containing addresses and/or parameters for the stateful table set 615.

The DSPU 610 can perform one or more stateful operations, while a stateful table 615 can store state data used and generated by the DSPU 610. Though shown as a single DSPU 610, in some embodiments this may represent multiple DSPUs within a match-action stage. For example, some embodiments can include two DSPUs and two stateful tables. In some embodiments, the DSPU can include one or more programmable arithmetic logic unit (ALUs) that perform operations synchronously with the dataflow of the packet-processing pipeline (e.g., synchronously at the line rate). As such, the DSPU can process a different PHV on a clock cycle, thus ensuring that the DSPU would be able to operate synchronously with the dataflow of the packet-processing pipeline. In some embodiments, a DSPU can perform a computation with fixed latency (e.g., fixed number of clock cycles). In some embodiments, the local or remote control plane provides configuration data to program a DSPU.

The DSPU 610 can output a set of action parameters to the action crossbar 630. The action parameter memory 620 can outputs a set of action parameters to this crossbar 630. The action parameter memory 620 can retrieve the action parameter that it outputs from its record that is identified by the address provided by the match table set 605. The action crossbar 630 in some embodiments can map the action parameters received from the DSPU 610 and action parameter memory 620 to an action parameter bus 640 of the action engine 635. Bus 640 (or other connection) can provide a set of action parameters to action engine 635. For different data packets, the action crossbar 630 can map the action parameters from DSPU 610 and memory 620 differently to bus 640. Crossbar 630 can supply the action parameters from either of these sources in their entirety to this bus 640, or it can concurrently select different portions of these parameters for this bus.

The action engine 635 can receive a set of instructions to execute from the action instruction memory 625. Memory 625 can retrieve the instruction set from its record that is identified by the address provided by the match table set 605. The action engine 635 can receive the PHV for each packet that the MAU processes. Such a PHV can also contain a portion or the entirety of a set of instructions to process and/or a set of parameters for processing the instruction.

The action engine 635 in some embodiments can include a parameter multiplexer and a very large instruction word (VLIW) processor, which is a set of one or more ALUs. In some embodiments, the parameter multiplexer can receive the parameter sets from the action crossbar 630 and input PHV and can output the parameters as operands to the VLIW processor according to the instruction set (from an instruction memory or the PHV. The VLIW processor can execute instructions (from an instruction memory or the PHV) applied to the operands received from the parameter multiplexer. The action engine 635 can store the output of its operation in the PHV in order to effectuate a packet forwarding operation and/or stateful operation of its MAU stage 600. The output of the action engine 635 can form a modified PHV (PHV') for the next MAU stage.

In some embodiments, one or more match-action stage 600 of a processing pipeline of some embodiments has the ability to run an ingress thread for processing an ingress packet and an egress thread for processing an egress packet. For one or more clock cycles, an MAU stage runs either both an ingress and egress thread, one or the other, or neither, depending on whether ingress and/or egress packets are provided to the stage (e.g., in the PHV) for that cycle. Some embodiments provide the ability to run one or more additional threads for processing non-packet data. In some embodiments, this non-packet thread is a third thread that is tied to the ingress thread. That is, a set of PHV data containers allocated to the non-packet data have the same timing as the ingress PHV (if one is present) through the match-action stages, which are configured to execute both the ingress and non-packet threads. As the match-action resources are configurable, an administrator can configure the ingress and egress processing as well as the non-packet processing in some embodiments, such that each of these threads are effectively running different programs composed by the administrator, using different resources of the pipeline (e.g., different memory units, PHV containers, etc.). In some embodiments, the non-packet thread is tied to the egress thread, or non-packet threads may be tied to both ingress and egress threads.

In some embodiments, an ingress pipeline can use queue state data (e.g., queue depth) stored in the stateful tables for various operations in different embodiments. Some embodiments use the queue state data for queries regarding flow statistics, such as how often a particular queue (to which a specific flow is assigned) was filled past a threshold queue depth, or the percentage of queues (or a subset of queues) that are past a threshold queue depth at any given time. In some embodiments, the queue state data is not necessarily stored in stateful tables, and may be used directly by the ingress (or egress) packet thread processed synchronously with the non-packet queue state data.

Figure 7:
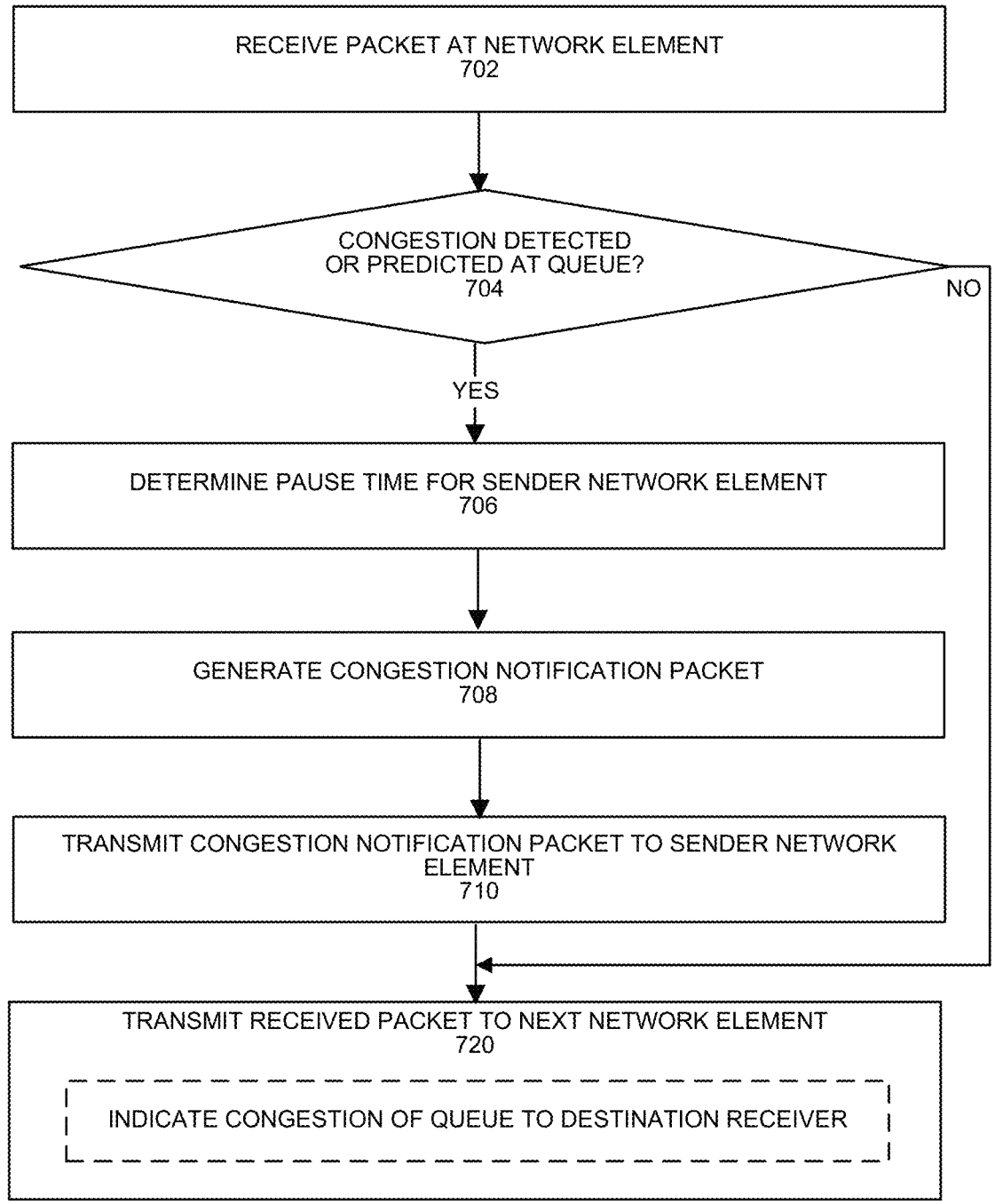
FIG. 7 depicts an example process.

FIG. 7 depicts an example process. At 702, a network element can receive a packet. For example, a network element can include a network interface, switch, router, server, interconnect, fabric, or any communications device. The packet can be received from a particular sender with a particular source IP address.

At 704, determination can be made at an ingress pipeline as to whether congestion is expected to occur in a queue that the packet is to be stored. A determination that the queue is congested or likely congested can be based on a probabilistic function such as Proportional-Integral (PI), or RED (Random Early Detection). The probabilistic function can take an input of the depth of the queue that the received packet is forwarded to and computes the probability the queue is congested. In some examples, the queue can be determined to be congested if its depth is at or above a congestion threshold. For a determination the queue is congested, the process continues to 706. For a determination the queue is not congested, the process continues to 720.

At 706, the network element can determine a pause time for a sender of the packet. For example, the pause time can be an expected time for the congested queue to drain to a target queue depth. An example manner of determining a pause time is described with respect to FIG. 3.

At 708, the network element can generate a congestion notification packet identifying a destination network element and pause time. For example, the congestion notification packet can include a Source Quench Packet (SQP). In some examples, the congestion notification packet can include one or more of: 1) time to drain the congested queue down to the target queue depth and 2) endpoint destination IP address of the packet. In some examples, flow-level control can be performed whereby a congestion notification packet indicates a particular flow is to be paused and the sender pauses the transmission of the particular flow for the pause duration. For example, an ingress pipeline of the network element can determine the pause time and form the congestion notification packet using one or more match action units (MAUs). The congestion notification packet can be stored by an ingress pipeline of the network element into a queue that is uncongested. At 710, the network element can transmit the congestion notification packet to the sender of the packet to be stored in the congested queue.

At 720, the network element can forward the packet to a next destination network element. In some examples, the packet is placed in a queue that is congested and the packet is egressed from the congested queue. In some examples, the packet is placed in an uncongested queue and the packet is egressed from the queue. The network element can insert an ECN into the packet for indication to the destination that congestion occurred.

Figure 8:
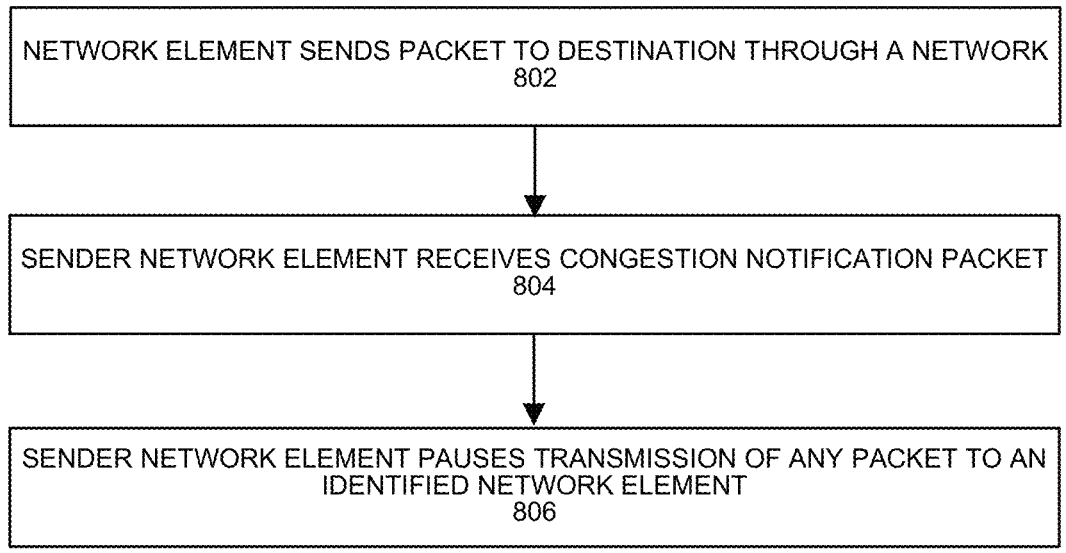
FIG. 8 depicts an example process.

FIG. 8 depicts an example process that can be performed by a sender network element that sends one or more packets. At 802, a sender transmits a packet to a destination receiver via one or more network elements. At 804, the sender receives a congestion notification packet. In some examples, the congestion notification packet can include one or more of: 1) time to drain the congested queue down to a target queue depth and 2) endpoint destination IP address. The network element associated with the endpoint destination IP address can experience congestion at an intermediary network element and the intermediary network element could have sent the congestion notification packet. Based on receipt of the congestion notification packet, the sender pauses its transmission towards the destination IP address for the specified duration of pause time. At 806, the sender can pause transmission to the destination IP address for the pause duration. The sender can resume transmission of packets to the destination IP address after the pause duration elapses. In some examples, flow-level control can be performed whereby a congestion notification packet indicates a particular flow is to be paused and the sender pauses the transmission of the particular flow for the pause duration. In some examples, instead of pausing transmission, the sender can reduce its transmit rate for the pause duration.

Figure 9:
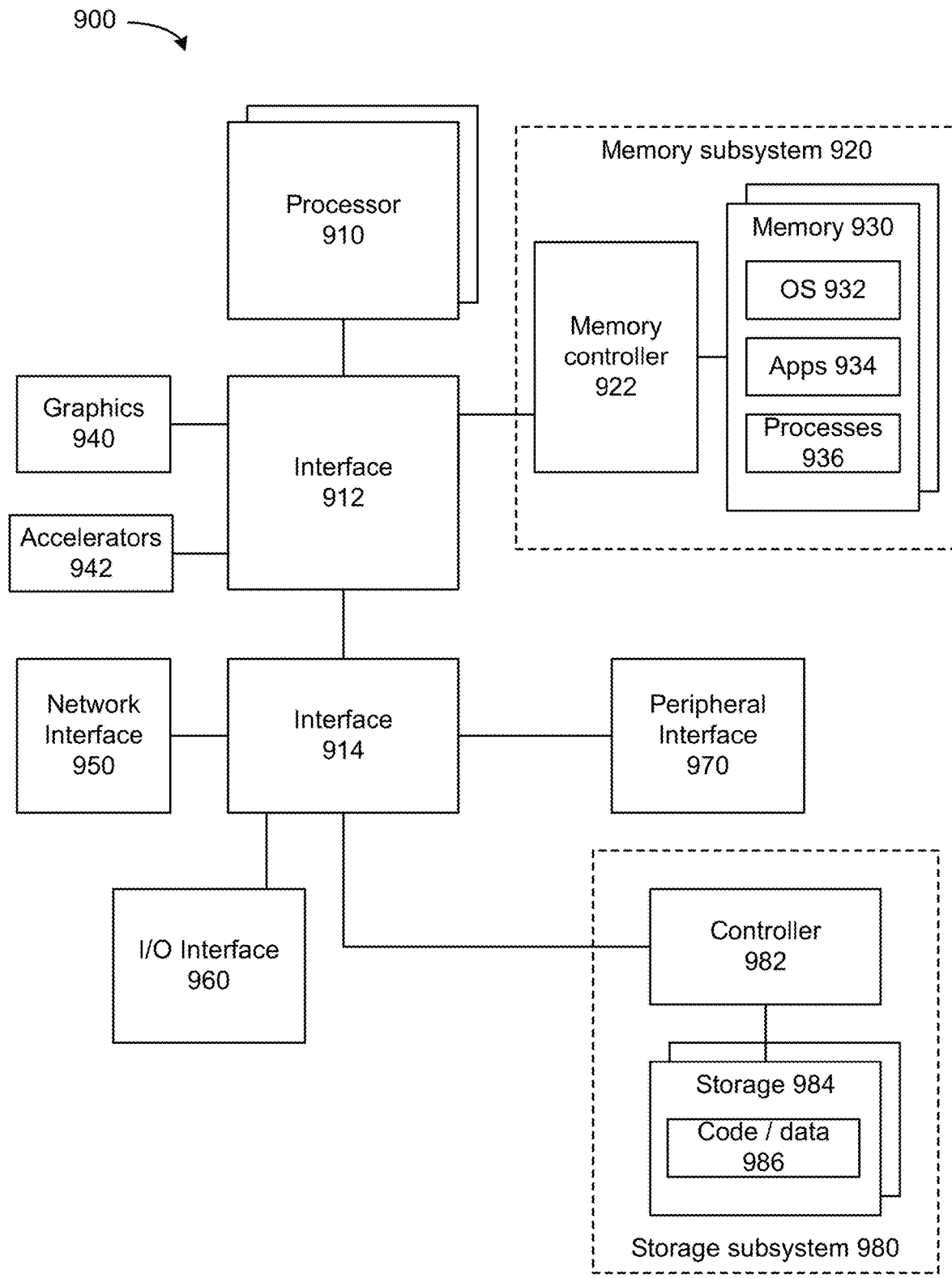
FIG. 9 depicts a system.

FIG. 9 depicts a system. The system can use embodiments described herein to perform control of packet transmission. System 900 includes processor 910, which provides processing, operation management, and execution of instructions for system 900. Processor 910 can include any type of microprocessor, central processing unit (CPU), graphics processing unit (GPU), processing core, or other processing hardware to provide processing for system 900, or a combination of processors. Processor 910 controls the overall operation of system 900, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 900 includes interface 912 coupled to processor 910, which can represent a higher speed interface or a high throughput interface for system components that needs higher bandwidth connections, such as memory subsystem 920 or graphics interface components 940, or accelerators 942. Interface 912 represents an interface circuit, which can be a standalone component or integrated onto a processor die. Where present, graphics interface 940 interfaces to graphics components for providing a visual display to a user of system 900. In one example, graphics interface 940 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 940 generates a display based on data stored in memory 930 or based on operations executed by processor 910 or both. In one example, graphics interface 940 generates a display based on data stored in memory 930 or based on operations executed by processor 910 or both.

Accelerators 942 can be programmable or fixed function offload engines that can be accessed or used by a processor 910. For example, an accelerator among accelerators 942 can provide compression (DC) capability, cryptography services such as public key encryption (PKE), cipher, hash/authentication capabilities, decryption, or other capabilities or services. In some embodiments, in addition or alternatively, an accelerator among accelerators 942 provides field select controller capabilities as described herein. In some cases, accelerators 942 can be integrated into a CPU or connected to CPU by various devices (e.g., a connector to a motherboard or circuit board that includes a CPU and provides an electrical interface with the CPU). For example, accelerators 942 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 942 can provide multiple neural networks, CPUs, processor cores, general purpose graphics processing units, or graphics processing units can be made available for use by artificial intelligence (AI) or machine learning (ML) models. For example, the AI model can use or include any or a combination of a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 920 represents the main memory of system 900 and provides storage for code to be executed by processor 910, or data values to be used in executing a routine. Memory subsystem 920 can include one or more memory devices 930 such as read-only memory (ROM), flash memory, one or more varieties of random access memory (RAM) such as DRAM, or other memory devices, or a combination of such devices. Memory 930 stores and hosts, among other things, operating system (OS) 932 to provide a software platform for execution of instructions in system 900. Additionally, applications 934 can execute on the software platform of OS 932 from memory 930. Applications 934 represent programs that have their own operational logic to perform execution of one or more functions. Processes 936 represent agents or routines that provide auxiliary functions to OS 932 or one or more applications 934 or a combination. OS 932, applications 934, and processes 936 provide software logic to provide functions for system 900. In one example, memory subsystem 920 includes memory controller 922, which is a memory controller to generate and issue commands to memory 930. It will be understood that memory controller 922 could be a physical part of processor 910 or a physical part of interface 912. For example, memory controller 922 can be an integrated memory controller, integrated onto a circuit with processor 910.

While not specifically illustrated, it will be understood that system 900 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 900 includes interface 914, which can be coupled to interface 912. In one example, interface 914 represents an interface circuit, which can include standalone components and integrated circuitry. In one example, multiple user interface components or peripheral components, or both, couple to interface 914. Network interface 950 provides system 900 the ability to communicate with remote devices (e.g., servers or other computing devices) over one or more networks. Network interface 950 can include an Ethernet adapter, wireless interconnection components, cellular network interconnection components, USB (universal serial bus), or other wired or wireless standards-based or proprietary interfaces. Network interface 950 can transmit data to a device that is in the same data center or rack or a remote device, which can include sending data stored in memory. Network interface 950 can receive data from a remote device, which can include storing received data into memory. Various embodiments can be used in connection with network interface 950, processor 910, and memory subsystem 920.

In one example, system 900 includes one or more input/output (I/O) interface(s) 960. I/O interface 960 can include one or more interface components through which a user interacts with system 900 (e.g., audio, alphanumeric, tactile/touch, or other interfacing). Peripheral interface 970 can include any hardware interface not specifically mentioned above. Peripherals refer generally to devices that connect dependently to system 900. A dependent connection is one where system 900 provides the software platform or hardware platform or both on which operation executes, and with which a user interacts.

In one example, system 900 includes storage subsystem 980 to store data in a nonvolatile manner. In one example, in certain system implementations, at least certain components of storage 980 can overlap with components of memory subsystem 920. Storage subsystem 980 includes storage device(s) 984, which can be or include any conventional medium for storing large amounts of data in a nonvolatile manner, such as one or more magnetic, solid state, or optical based disks, or a combination. Storage 984 holds code or instructions and data 986 in a persistent state (e.g., the value is retained despite interruption of power to system 900). Storage 984 can be generically considered to be a "memory," although memory 930 is typically the executing or operating memory to provide instructions to processor 910. Whereas storage 984 is nonvolatile, memory 930 can include volatile memory (e.g., the value or state of the data is indeterminate if power is interrupted to system 900). In one example, storage subsystem 980 includes controller 982 to interface with storage 984. In one example controller 982 is a physical part of interface 914 or processor 910 or can include circuits or logic in both processor 910 and interface 914.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). Another example of volatile memory includes cache or static random access memory (SRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 900. More specifically, power source typically interfaces to one or multiple power supplies in system 900 to provide power to the components of system 900. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 900 can be implemented using interconnected compute sleds of processors, memories, storages, network interfaces, and other components. High speed interconnects can be used such as PCIe, Ethernet, or optical interconnects (or a combination thereof).

In an example, system 900 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick User Datagram Protocol Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Figure 10:
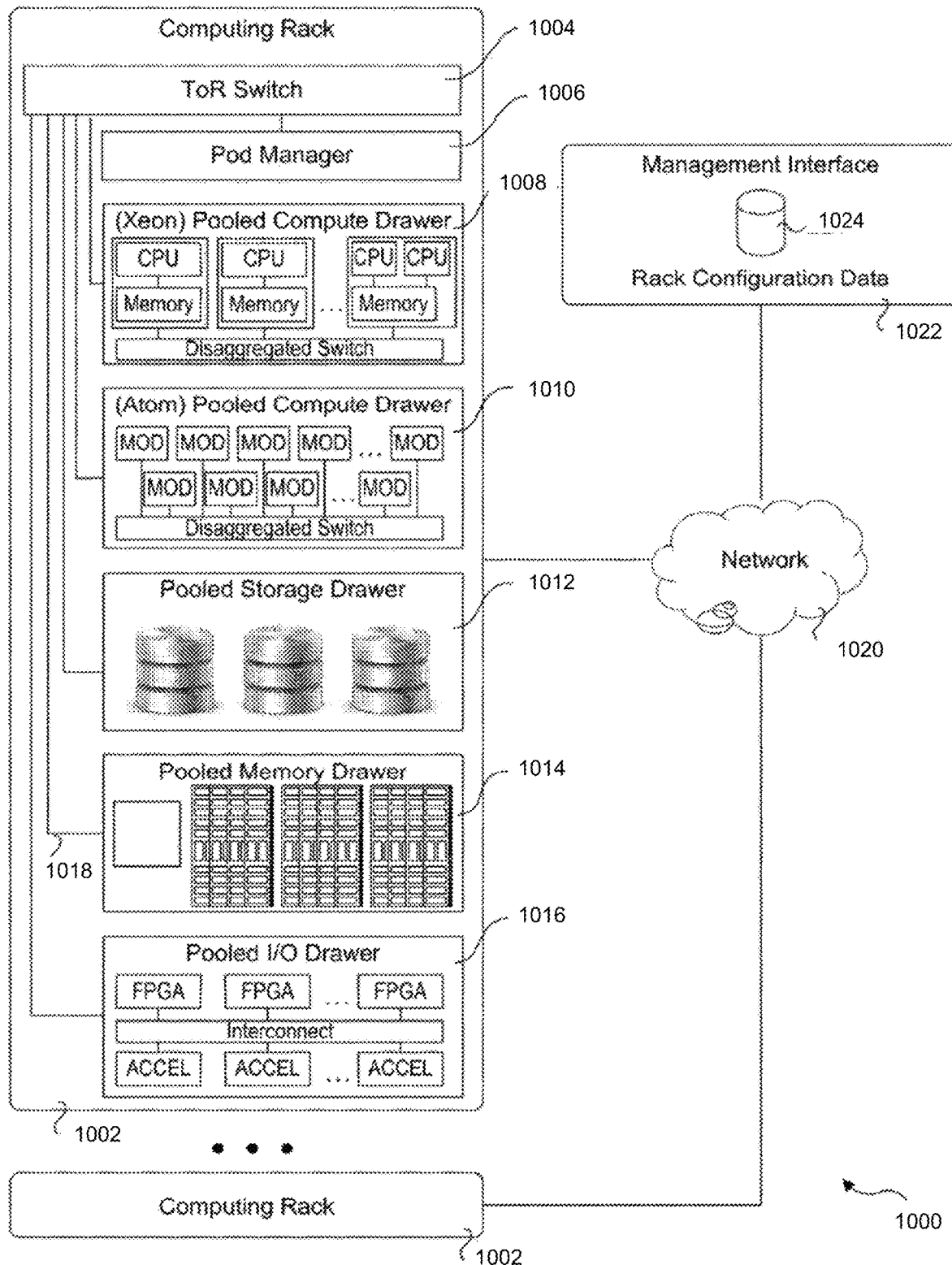
FIG. 10 depicts an environment.

FIG. 10 depicts an environment 1000 that includes multiple computing racks 1002, each including a Top of Rack (ToR) switch 1004, a pod manager 1006, and a plurality of pooled system drawers. Various embodiments can perform control of packet transmission in accordance with embodiments described herein. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 1008, and Intel® ATOM™ pooled compute drawer 1010, a pooled storage drawer 1012, a pooled memory drawer 1014, and a pooled I/O drawer 1016. Each of the pooled system drawers is connected to ToR switch 1004 via a high-speed link 1018, such as a 40 Gigabit/second (Gb/s) or 100 Gb/s Ethernet link or a 100+Gb/s Silicon Photonics (SiPh) optical link. In one embodiment high-speed link 1018 comprises an 800 Gb/s SiPh optical link.

Multiple of the computing racks 1002 may be interconnected via their ToR switches 1004 (e.g., to a pod-level switch or data center switch), as illustrated by connections to a network 1020. In some embodiments, groups of computing racks 1002 are managed as separate pods via pod manager(s) 1006. In one embodiment, a single pod manager is used to manage all of the racks in the pod. Alternatively, distributed pod managers may be used for pod management operations.

Environment 1000 further includes a management interface 1022 that is used to manage various aspects of the environment. This includes managing rack configuration, with corresponding parameters stored as rack configuration data 1024.

Figure 11:
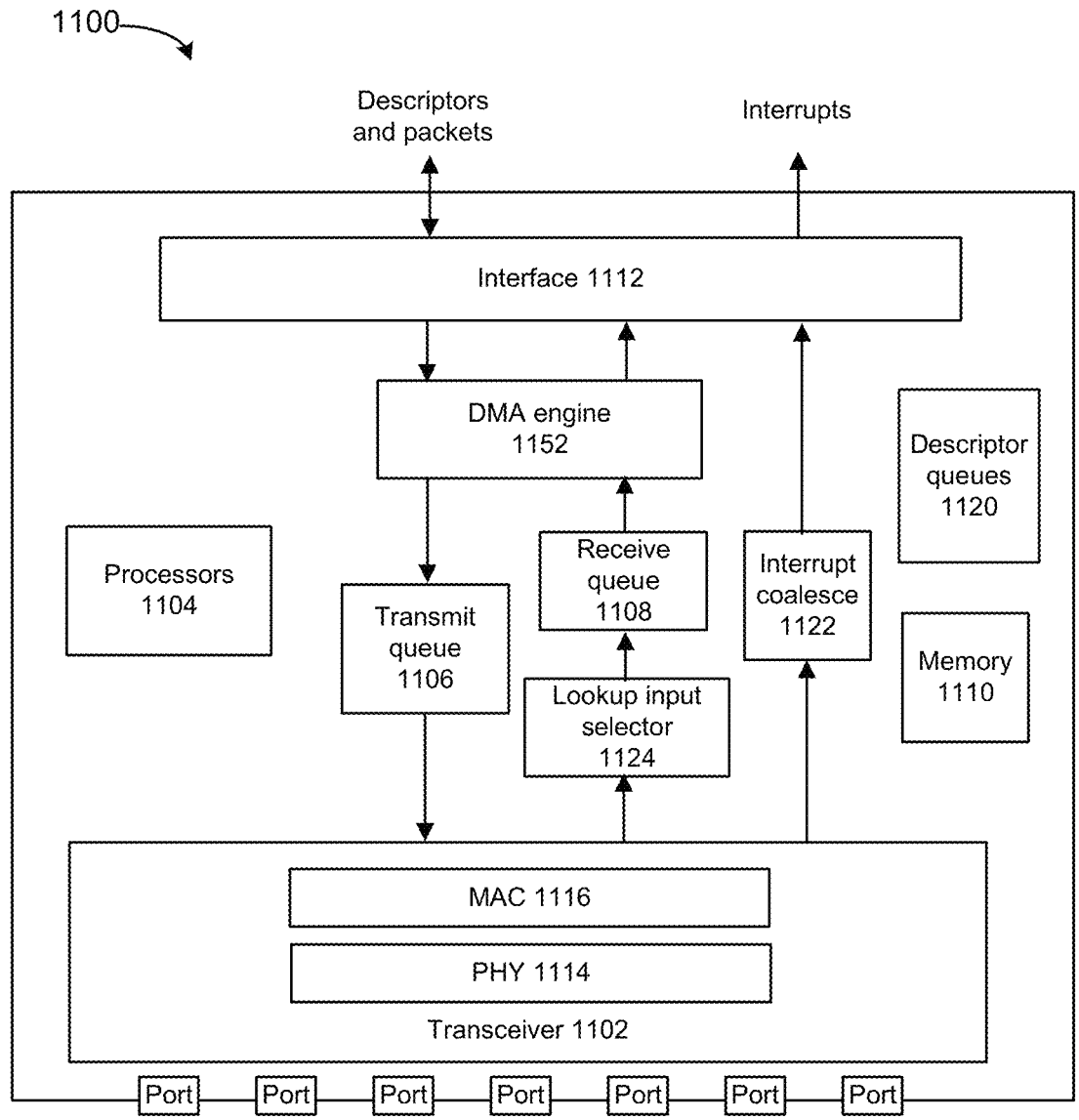
FIG. 11 depicts an example network element.

FIG. 11 depicts an example network element that can use embodiments or be used by embodiments to perform congestion management. Network interface 1100 can include transceiver 1102, processors 1104, transmit queue 1106, receive queue 1108, memory 1110, and bus interface 1112, and DMA engine 1152. Transceiver 1102 can be capable of receiving and transmitting packets in conformance with the applicable protocols such as Ethernet as described in IEEE 802.3, although other protocols may be used. Transceiver 1102 can receive and transmit packets from and to a network via a network medium (not depicted). Transceiver 1102 can include PHY circuitry 1114 and media access control (MAC) circuitry 1116. PHY circuitry 1114 can include encoding and decoding circuitry (not shown) to encode and decode data packets according to applicable physical layer specifications or standards. MAC circuitry 1116 can be configured to assemble data to be transmitted into packets, that include destination and source addresses along with network control information and error detection hash values. Processors 1104 can be any a combination of a: processor, core, graphics processing unit (GPU), field programmable gate array (FPGA), application specific integrated circuit (ASIC), or other programmable hardware device that allow programming of network interface 1100. For example, processors 1104 can provide for identification of a resource to use to perform a workload and generation of a bitstream for execution on the selected resource. For example, a "smart network interface" can provide packet processing capabilities in the network interface using processors 1104.

Packet allocator 1124 can provide distribution of received packets for processing by multiple CPUs or cores using timeslot allocation described herein or RSS. When packet allocator 1124 uses RSS, packet allocator 1124 can calculate a hash or make another determination based on contents of a received packet to determine which CPU or core is to process a packet.

Interrupt coalesce 1122 can perform interrupt moderation whereby network interface interrupt coalesce 1122 waits for multiple packets to arrive, or for a time-out to expire, before generating an interrupt to host system to process received packet(s). Receive Segment Coalescing (RSC) can be performed by network interface 1100 whereby portions of incoming packets are combined into segments of a packet. Network interface 1100 provides this coalesced packet to an application.

Direct memory access (DMA) engine 1152 can copy a packet header, packet payload, and/or descriptor directly from host memory to the network interface or vice versa, instead of copying the packet to an intermediate buffer at the host and then using another copy operation from the intermediate buffer to the destination buffer.

Memory 1110 can be any type of volatile or non-volatile memory device and can store any queue or instructions used to program network interface 1100. Transmit queue 1106 can include data or references to data for transmission by network interface. Receive queue 1108 can include data or references to data that was received by network interface from a network. Descriptor queues 1120 can include descriptors that reference data or packets in transmit queue 1106 or receive queue 1108. Bus interface 1112 can provide an interface with host device (not depicted). For example, bus interface 1112 can be compatible with PCI, PCI Express, PCI-x, Serial ATA, and/or USB compatible interface (although other interconnection standards may be used).

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes a method comprising: a network element receiving a packet and generating a congestion notification packet to an endpoint sender of the packet before the packet is stored in a target queue that is determined to be congested.

Example 2 includes any example, wherein the target queue comprises an egress queue.

Example 3 includes any example, wherein the target queue comprises an ingress queue.

Example 4 includes any example, and includes an ingress pipeline generating the congestion notification packet.

Example 5 includes any example, wherein the generating a congestion notification packet is based on a depth of the target queue.

Example 6 includes any example, wherein the generating a congestion notification packet is based on probability the target queue is congested and the probability the target queue is congested is based on a probabilistic function including one or more of: a threshold level, Proportional-Integral (PI) or Random Early Detection (RED).

Example 7 includes any example, and includes determining a pause time for the endpoint sender to pause sending particular packets based at least on a time for the target queue to drain to a target level.

Example 8 includes any example, wherein the congestion notification packet comprises one or more of: a pause time for the endpoint sender to pause sending packets, destination address of the network element, or flow identifier of a flow to be paused.

Example 9 includes any example, wherein the congestion notification packet is compatible with one or more of: RDMA over Converged Ethernet (RoCE) v2; In-band Network Telemetry (INT); Internet Engineering Task Force (IETF) In-situ Operations, Administration, and Maintenance (IOAM); or IETF Inband Flow Analyzer (IFA).

Example 10 includes any example, wherein receipt of the congestion notification packet by the endpoint sender is to cause the endpoint sender to perform one or more of: pause its packet transmission towards the congested network element for a specified duration of pause time or reduce a transmit rate to an originator of the congestion notification packet.

Example 11 includes any example, and including sending the received packet with an Explicit Congestion Notification (ECN) to a destination endpoint network element.

Example 12 includes any example, and includes an apparatus comprising: a network element comprising an ingress pipeline and at least one queue from which to egress packets, wherein: the network element is to receive a packet and generate a congestion notification packet at the ingress pipeline to a sender of the packet based on detection of congestion in a target queue that is to store the packet and before the packet is stored in a congested target queue.

Example 13 includes any example, wherein the target queue comprises an egress queue or an ingress queue.

Example 14 includes any example, wherein the network element is to generate a congestion notification packet based on a queue depth of the target queue.

Example 15 includes any example, wherein the network element is to generate a congestion notification packet based on the probability the queue is congested and the probability the queue is congested is based on a probabilistic function including one or more of: a threshold level, Proportional-Integral (PI) or Random Early Detection (RED).

Example 16 includes any example, wherein the congestion notification packet comprises one or more of: a pause time for the sender to pause sending particular packets, destination address of the network element, or flow identifier of a flow to be paused.

Example 17 includes any example, wherein the congestion notification packet is compatible with one or more of: RDMA over Converged Ethernet (RoCE) v2; In-band Network Telemetry (INT); Internet Engineering Task Force (IETF) In-situ Operations, Administration, and Maintenance (IOAM); or IETF Inband Flow Analyzer (IFA).

Example 18 includes any example, wherein receipt of the congestion notification packet is to cause the sender to perform one or more of: pause its packet transmission towards the congested network element for a specified duration of pause time or reduce a transmit rate to an originator of the congestion notification packet.

Example 19 includes any example, wherein the ingress pipeline comprises one or more match action units to detect congestion in a target queue, determine a duration of a sender pause time, and generate the congestion notification packet.

Example 20 includes any example, wherein the network element comprises one or more of: a network interface, switch, virtual switch, smart network interface card (NIC), or router.

Example 21 includes any example, and includes a plurality of servers communicatively coupled with the network element, wherein at least one server comprises at least network element, wherein the at least network element is to pause transmission based on receipt of the congestion notification packet.

Example 22 includes any example, wherein the network element comprises one or more ports and one or more physical layer interfaces.

What is claimed is:

1. A method comprising:
   a network element receiving a packet and
   the network element:
   determining a probability that a target queue will be congested prior to enqueuing the packet into the target queue,
   generating a congestion notification packet for transmission and transmitting the congestion notification packet to an endpoint sender of the packet before storing the packet into a target queue, wherein the congestion notification packet comprises (1) an estimated pause time associated with reducing a level of the target queue to a queue depth and (2) a destination Internet Protocol (IP) address of the packet, wherein the generating the congestion notification packet is based on the probability that the target queue will be congested, and wherein the storing the packet into the target queue comprises storing the packet into the target queue that is determined to be congested.

2. The method of claim 1, wherein the target queue comprises an egress queue.

3. The method of claim 1, wherein the target queue comprises an ingress queue.

4. The method of claim 1, comprising an ingress pipeline generating the congestion notification packet.

5. The method of claim 1, wherein the generating a congestion notification packet is based on a depth of the target queue.

6. The method of claim 1, comprising determining a pause time for the endpoint sender to pause sending particular packets based at least on a time for the target queue level to drain to the queue depth.

7. The method of claim 1, wherein the congestion notification packet is compatible with one or more of: RDMA over Converged Ethernet (RoCE) v2; In-band Network Telemetry (INT); Internet Engineering Task Force (IETF) In-situ Operations, Administration, and Maintenance (IOAM); or IETF Inband Flow Analyzer (IFA).

8. The method of claim 1, wherein receipt of the congestion notification packet by the endpoint sender is to cause the endpoint sender to perform one or more of: pause its packet transmission to the network element for a specified duration of pause time or reduce a transmit rate to the network element.

9. The method of claim 1, comprising sending the received packet with an Explicit Congestion Notification (ECN) to a destination endpoint network element.

10. The method of claim 1, comprising: transmitting the congestion notification packet to the endpoint sender prior to egress of the packet from the target queue.

11. The method of claim 1, wherein the generating the congestion notification packet for transmission to the endpoint sender of the packet comprises generating the congestion notification packet for transmission to the endpoint sender of the packet based on predicted congestion of the target queue including enqueue of the packet into the target queue.

12. The method of claim 1, wherein the generating the congestion notification packet comprises including a source IP address from the packet as a destination IP address of the congestion notification packet.

13. The method of claim 1, wherein the probability that the target queue will be congested is based on a probabilistic function including one or more of: Proportional-Integral (PI) or Random Early Detection (RED).

14. An apparatus comprising:
a network element comprising an ingress pipeline and at least one queue from which to egress packets, wherein:
the network element is to;
receive a packet;
determine a probability that a target queue will be congested prior to enqueuing the packet into the target queue; and
generate a congestion notification packet and transmit the congestion notification packet, at the ingress pipeline, to a sender of the packet based on detection of congestion in a target queue that is to store the packet and before the packet is stored in a congested target queue, wherein the generate the congestion notification packet is based on the probability that the target queue will be congested, wherein the congestion notification packet comprises (1) an estimated pause time associated with reduction of a level of the target queue to a queue depth and (2) a destination Internet Protocol (IP) address of the packet, and wherein the storage of the packet into the target queue comprises storage of the packet into the target queue that is determined to be congested.

15. The apparatus of claim 14, wherein the target queue comprises an egress queue or an ingress queue.

16. The apparatus of claim 14, wherein the network element is to generate a congestion notification packet based on a queue depth of the target queue.

17. The apparatus of claim 14, wherein the congestion notification packet is compatible with one or more of: RDMA over Converged Ethernet (ROCE) v2; In-band Network Telemetry (INT); Internet Engineering Task Force (IETF) In-situ Operations, Administration, and Maintenance (IOAM); or IETF Inband Flow Analyzer (IFA).

18. The apparatus of claim 14, wherein receipt of the congestion notification packet is to cause the sender to perform one or more of: pause its packet transmission to the network element for a specified duration of pause time or reduce a transmit rate to the network element.

19. The apparatus of claim 14, wherein the ingress pipeline is to perform one or more match action operations to predict when congestion will occur in the target queue, determine a duration of a sender pause time, and generate the congestion notification packet.

20. The apparatus of claim 14, wherein the network element comprises one or more of: a network interface, switch, virtual switch, smart network interface card (NIC), or router.

21. The apparatus of claim 14, comprising a plurality of servers communicatively coupled with the network element, wherein at least one server of the plurality of servers comprises the network element, wherein the network element is to pause packet transmission based on receipt of the congestion notification packet.

22. The apparatus of claim 14, wherein the network element comprises one or more ports and one or more physical layer interfaces.

23. The apparatus of claim 14, wherein the target queue is associated with a destination IP address, the network element comprises circuitry to store data comprising: the destination IP address and depth of the target queue, rate of increase of depth of the target queue, and drain rate of the target queue, and the network element comprises circuitry to detect congestion in the target queue based on the data, determine a duration of a sender pause time based on the data, and generate the congestion notification packet based on detection of congestion in the target queue.

24. The apparatus of claim 14, wherein the probability that the target queue will be congested is based on a probabilistic function including one or more of: Proportional-Integral (PI) or Random Early Detection (RED).

* * * * *

UNITED STATES PATENT AND TRADEMARK OFFICE
CERTIFICATE OF CORRECTION

PATENT NO. : 12,273,270 B2
APPLICATION NO. : 16/878466
DATED : April 8, 2025
INVENTOR(S) : Junggun Lee et al.

Page 1 of 1

It is certified that error appears in the above-identified patent and that said Letters Patent is hereby corrected as shown below:

In the Claims

Claim 17 should read: The apparatus of claim 14, wherein the congestion notification packet is compatible with one or more of: RDMA over Converged Ethernet (RoCE) v2; In-band Network Telemetry (INT); Internet Engineering Task Force (IETF) In-situ Operations, Administration, and Maintenance (IOAM); or IETF Inband Flow Analyzer (IFA).

Signed and Sealed this
Third Day of June, 2025

Coke Morgan Stewart
*Acting Director of the United States Patent and Trademark Office*